US010466378B2

(12) United States Patent
Turnbull

(10) Patent No.: US 10,466,378 B2
(45) Date of Patent: Nov. 5, 2019

(54) IMPACT ASSESSMENT OF MARINE SEISMIC SURVEYS

(71) Applicant: PGS Geophysical AS, Oslo (NO)

(72) Inventor: Neil Hugh Richard Turnbull, Oslo (NO)

(73) Assignee: PGS Geophysical AS, Oslo (NO)

( * ) Notice: Subject to any disclaimer, the term of this patent is extended or adjusted under 35 U.S.C. 154(b) by 1001 days.

(21) Appl. No.: 14/715,420

(22) Filed: May 18, 2015

(65) Prior Publication Data
US 2016/0061977 A1 Mar. 3, 2016

Related U.S. Application Data

(60) Provisional application No. 62/045,352, filed on Sep. 3, 2014.

(51) Int. Cl.
*G01V 1/36* (2006.01)
*G01V 1/28* (2006.01)

(52) U.S. Cl.
CPC ............... *G01V 1/36* (2013.01); *G01V 1/282* (2013.01); *G01V 2210/14* (2013.01); *G01V 2210/1423* (2013.01); *G01V 2210/51* (2013.01); *G01V 2210/56* (2013.01); *G01V 2210/6222* (2013.01)

(58) Field of Classification Search
CPC . G01V 1/364; G01V 1/28; G01V 1/36; G01V 1/37; G01V 1/3817; G01V 2210/14; G01V 2210/51; G01V 2210/56; G01V 2210/6222; H04N 9/045
USPC ............ 702/17, 14; 367/46, 15, 16; 382/294
See application file for complete search history.

(56) References Cited

U.S. PATENT DOCUMENTS

| | | | | |
|---|---|---|---|---|
| 5,424,999 A | * | 6/1995 | Manin | G01V 1/36 367/15 |
| 2003/0163260 A1 | * | 8/2003 | Moerig | G01V 1/37 702/14 |
| 2006/0285438 A1 | * | 12/2006 | Arrowsmith | G01V 1/288 367/38 |

(Continued)

FOREIGN PATENT DOCUMENTS

GB 2 426 587 A 11/2005

OTHER PUBLICATIONS

Day, Anthony, et al., "Determining infill specifications based on geophysical criteria," SEG/Houston 2005 Annual Meeting 2205, pp. 80-83.

(Continued)

*Primary Examiner* — Regis J Betsch
*Assistant Examiner* — Kaleria Knox

(57) ABSTRACT

Methods and systems to assess in near real-time defects in seismic data resulting from noise and seismic data acquisition-system deviations during a marine survey are disclosed. Methods and systems apply forward modeling to a model of a subterranean formation to generate synthetic seismic data based on the noise and deviations in the seismic data acquisition system. The synthetic seismic data represents the seismic data that would be collected by a marine survey carried out on a subterranean formation with the same structure as the Earth model and includes defects that result from the noise and deviations in the seismic data acquisition system. Error estimation is applied to the synthetic seismic data in order to assess the defects at different stages of seismic data processing.

31 Claims, 24 Drawing Sheets

(56) References Cited

U.S. PATENT DOCUMENTS

| | | | | |
|---|---|---|---|---|
| 2008/0212895 A1* | 9/2008 | Mattox | ................. | H04N 9/045 |
| | | | | 382/294 |
| 2009/0141587 A1* | 6/2009 | Welker | ................ | G01V 1/3817 |
| | | | | 367/16 |
| 2013/0077438 A1* | 3/2013 | Roux | ...................... | G01V 1/28 |
| | | | | 367/46 |
| 2014/0200820 A1* | 7/2014 | El Yadari | ............... | G01V 1/364 |
| | | | | 702/17 |

OTHER PUBLICATIONS

Search Report, Application No. GB1515613.6, dated Jan. 20, 2016.

* cited by examiner

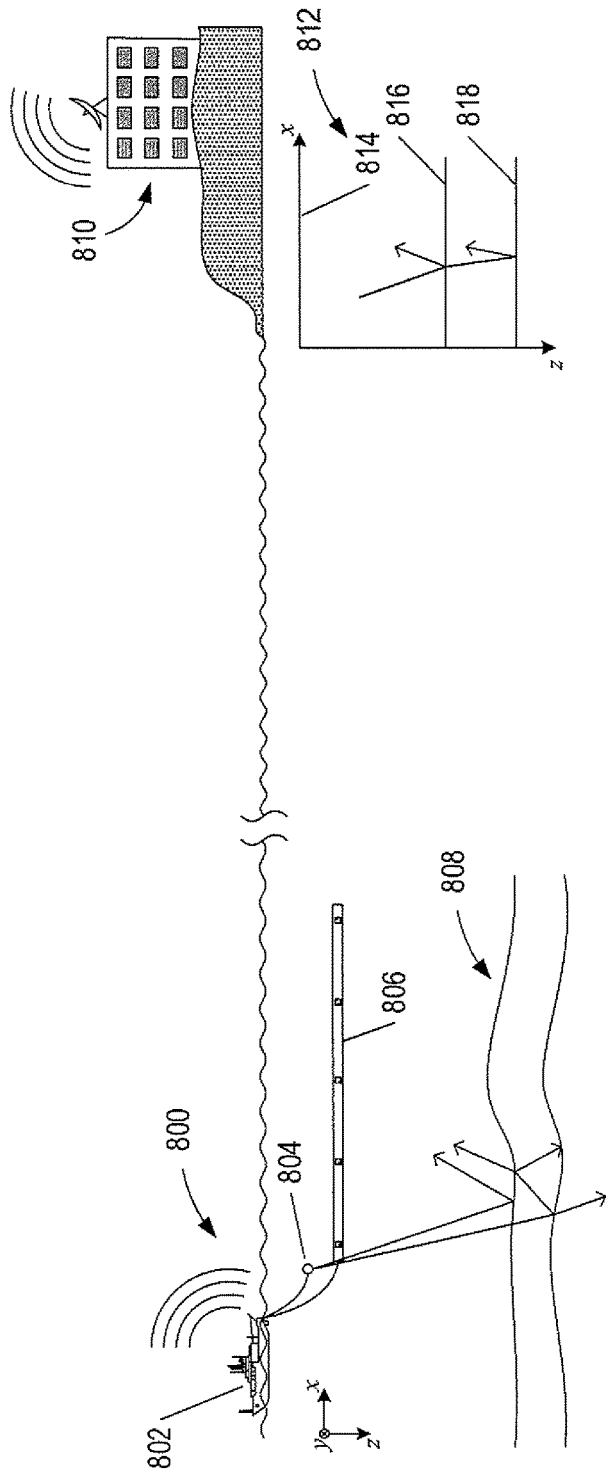

FIG. 8

| Source attributes | Receiver attributes | Actual system defects | |
|---|---|---|---|
| Source coordinates | Receiver coordinates | Mechanically propagated noise | Acoustic noise | Electrical noise |
| Source element depth | Receiver depth | Tow noise | Seismic interference | Crossfeed |
| Source element pressure | Receiver array response | Swell noise | Ship noise | Electrical spikes |
| Source element timing | | Bird noise | | |
| Nearfield hydrophone measurements | | Turn noise | | |

FIG. 9

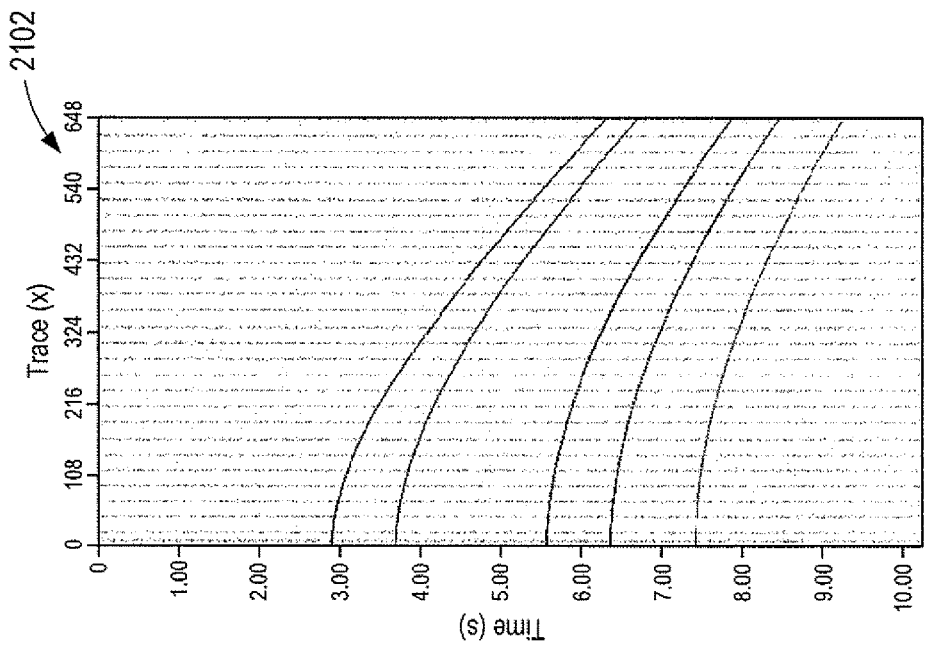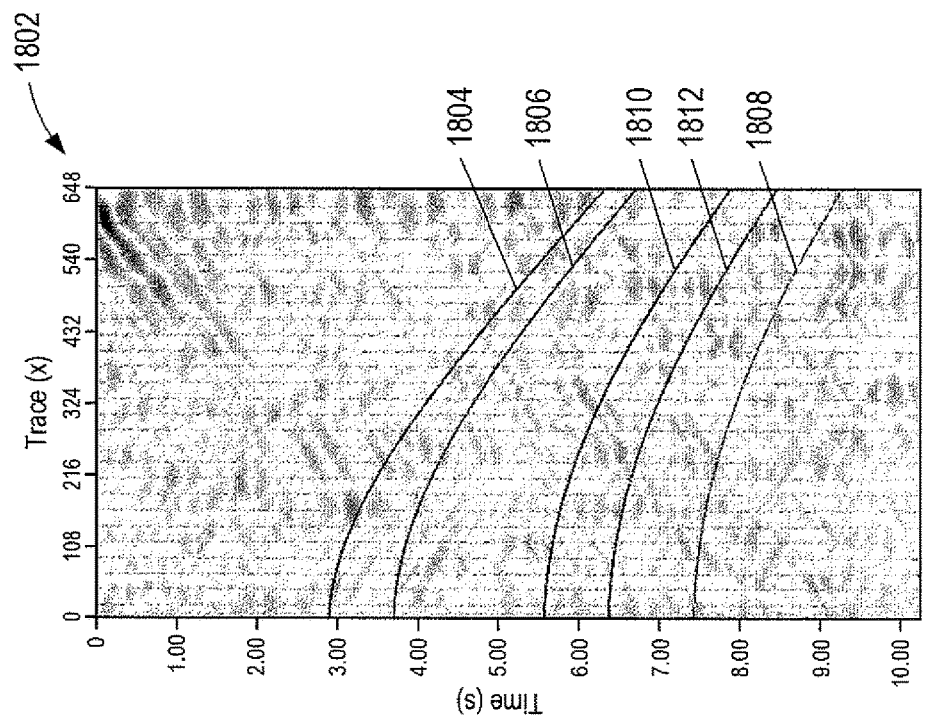
FIG. 21

IMPACT ASSESSMENT OF MARINE SEISMIC SURVEYS

CROSS-REFERENCE TO A RELATED APPLICATION

This application claims the benefit of Provisional Application 62/045,352, filed Sep. 3, 2014.

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic signals produced by one or more submerged seismic sources. The acoustic signals travel down through the water and into the subterranean formation. At interfaces between different types of rock or sediment of the subterranean formation, a portion of the acoustic signal energy may be refracted, a portion may be transmitted, and a portion may be reflected back toward the formation surface and into the body of water. A typical marine survey is carried out with a survey vessel that passes over the illuminated subterranean formation while towing elongated cable-like structures called streamers. The streamers may be equipped with a number of collocated, dual pressure and particle motion sensors that detect pressure and vertical particle motion wavefields, respectively, associated with the acoustic signals reflected back into the water from the subterranean formation. The pressure sensors generate seismic data that represents the pressure wavefield and the particle motion sensors generate seismic data that represents the vertical particle motion wavefield. The survey vessel receives and records the seismic data generated by the sensors.

After seismic-data acquisition, seismic data processing is used to enhance the seismic data and generate images of the subterranean formation. However in practice, the seismic data is typically contaminated with noise due to any number of different noise sources. The seismic data may also be adversely affected by acquisition-system deviations, such as source element dropout and streamer feathering. Noise and other factors that affect the quality of seismic data are called "defects." If the acquired seismic data are defective to the extent that the geophysical survey objectives are not met, mitigating actions such as equipment maintenance, changes to acquisition design or rejection and reacquisition of the data may be required. Because the cost in survey vessel production time arising from mitigating actions is great, it is desirable that quality control ("QC") measures are sufficiently rapid to quantify the impact of defects upon fulfillment of the geophysical objectives before the survey vessel acquires significant additional seismic data, and sufficiently accurate that the impact of each defect upon the seismic data may be assessed independently and the most significant mitigating actions prioritized correctly.

DESCRIPTION OF THE DRAWINGS

FIG. 8 shows a side-elevation view of an example marine seismic-data acquisition system and a seismic data processing facility.

FIG. 9 displays a list of various types of actual acquisition-system attributes.

FIGS. 18-22C show computational results of synthetic processed seismic data output at different stages of seismic data processing with defects.

DETAILED DESCRIPTION

Figure 1A:
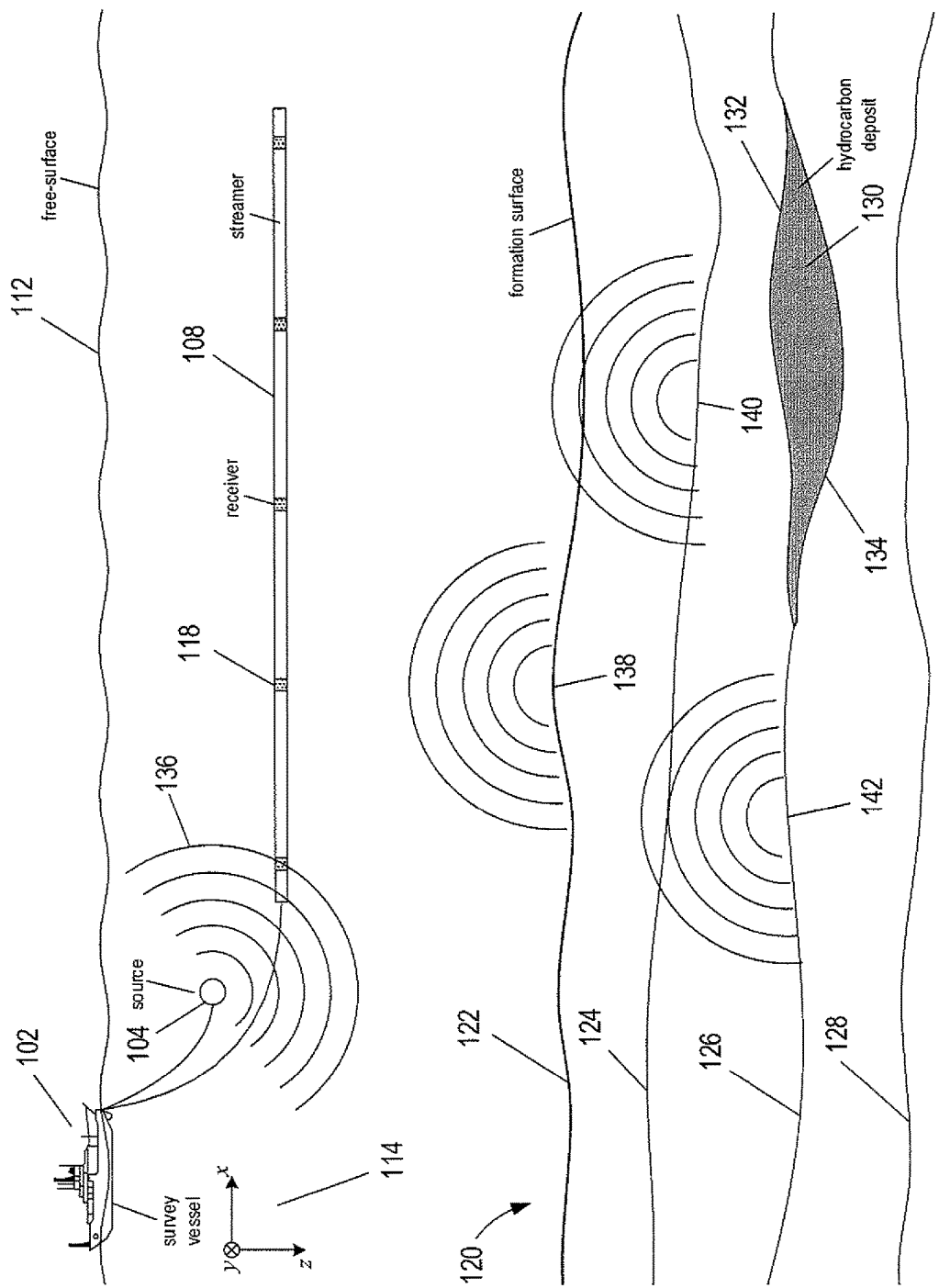
FIGS. 1A-1B show side-elevation and top views, respectively, of an example seismic data acquisition system.

This disclosure is directed to methods and systems to assess in near real-time defects in seismic data resulting from noise and acquisition-system deviations during a marine survey. The acquisition systems include a survey vessel, one or more sources, streamers, sensors and other components used to conduct a marine survey. Actual attributes associated with the acquisition system may be measured and recorded prior to and during the survey. The actual acquisition-system attributes include position and engineering characteristics of the acquisition system as measured by onboard systems and noise characteristics determined from recorded seismic data. Using the actual acquisition-system attributes as input, methods and systems apply forward modeling to a model of a subterranean formation (i.e., "Earth model") to generate synthetic seismic data. The synthetic seismic data represents the seismic data that would be collected by a marine survey carried out on a subterranean formation with the same structure as the Earth model and includes defects that result from various types of noise and deviations in the actual acquisition-system attributes. The synthetic seismic data is input to seismic data processing with error estimation to generate processed synthetic seismic data at different stages of seismic data processing. Each defect in the unprocessed and processed synthetic seismic data corresponds to an actual type of noise or actual specific deviation in the acquisition system.

Methods and systems allow selective input of actual acquisition-system attributes so that each defect may be assessed in isolation and/or in combination with other defects at any stage of seismic data processing such as downstream image gathers. Forward modeling and error estimation may be carried out in near real-time or during seismic-data acquisition so that defects may be assessed by QC personnel during a marine survey. By allowing QC personnel to assess defects at any point in a marine survey, the correct mitigating steps can be taken to reduce or eliminate the defects in a timely manner, rather than taking the far more costly approach of assessing defects in the actual seismic data at a later stage in the survey when the opportunity to reacquire the line easily or to increase the quality of subsequent data has already passed.

The synthetic seismic data and processed synthetic seismic data may also be compared with actual seismic data collected during a marine survey and processed actual seismic data generated at intermediate stages of seismic data processing in order to quantitatively identify any defects that may propagate through seismic data processing and adversely affect seismic-data interpretation and to confirm the validity of various forward modeling parameters used to generate the synthetic seismic data.

Forward modeling and error estimation are performed in near real-time so that effects of defects may be assessed by QC personnel at any time during a marine survey. The term "near real-time" refers to the time delay resulting from collecting, performing forward modeling and error estimation, and optionally transmitting relevant data or attributes to a remote facility. Near real-time refers to situations in which a time delay due to seismic-data collection, transmission, and performing forward modeling and error estimation is insignificant or imperceptible such that near real-time approximates real time. Near real-time also refers to longer time delays that are still short enough to allow timely use of the results of forward modeling and error estimation.

Forward modeling and error estimation may also be performed as a part of survey planning applications and before seismic data acquisition begins. Because no actual seismic data is acquired, there are no actual attributes, and no opportunity to calibrate the Earth model and processing assumptions against the actual Earth estimate obtained by processing actual seismic data. Forward modeling may be used with the same Earth model, but the defects associated with the acquisition system may be hypothetical, being taken from a similar survey or from some presumption about the likely performance of the acquisition systems in the anticipated environment and survey configuration. The results produced by methods and systems described herein may be used to predict downstream defects in image gathers and intermediate seismic data processing stages based on selected defects.

Figure 1B:
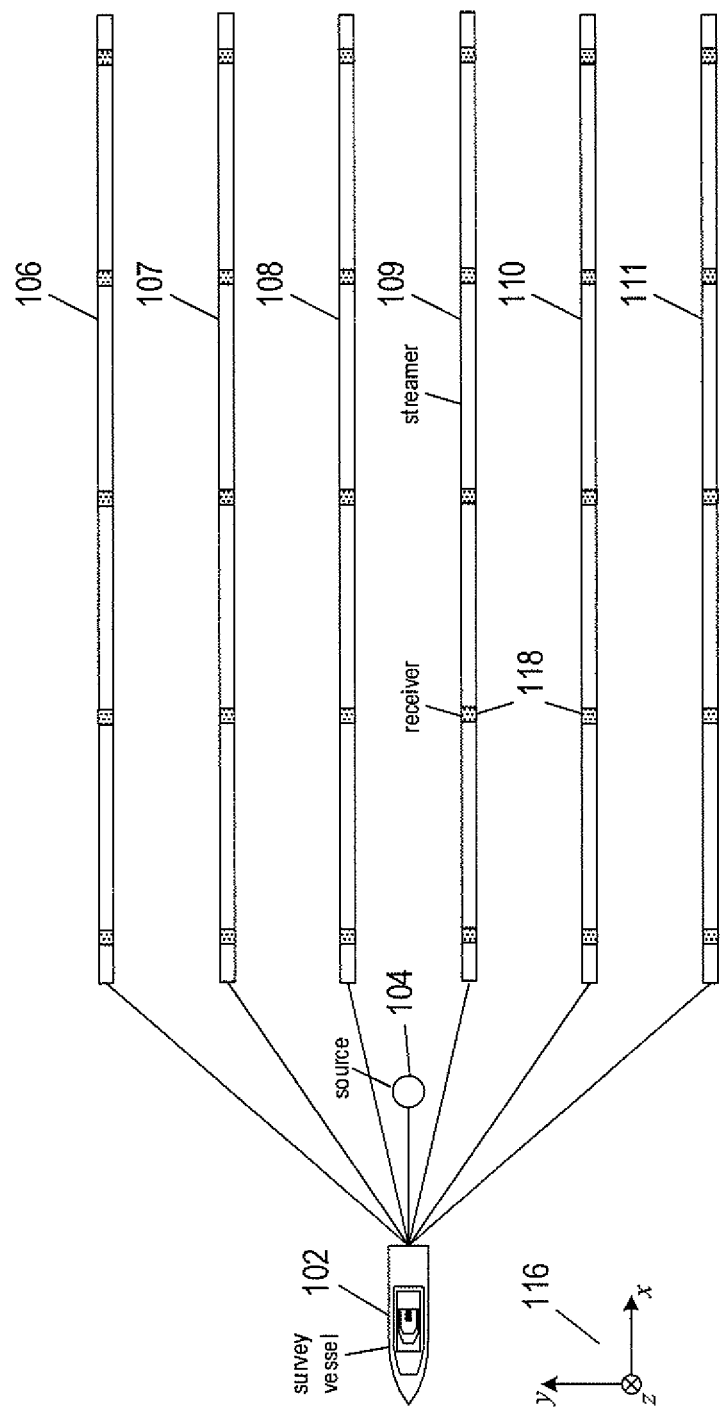

FIGS. 1A-1B show side-elevation and top views, respectively, of an example seismic data acquisition system composed of a survey vessel 102 towing a source 104 and six separate streamers 106-111 beneath a free-surface 112 of a body of water. The body of water can be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free-surface 112. However, in practice, the data acquisition surface may be smoothly varying due to active sea currents and weather conditions. In other words, although the streamers 106-111 are illustrated in FIGS. 1A and 1B and subsequent figures as straight and substantially parallel to the free-surface 112, in practice, the towed streamers may undulate as a result of dynamic conditions of the body of water in which the streamers are submerged or may have a curved shape as a result of vessel 102 turning or as a result of steering devices (not separately shown). A seismic data acquisition surface is not limited to having a planar horizontal orientation with respect to the free-surface 112. The streamers may be towed at depths that angle the data acquisition surface with respect to the free-surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more vessels.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free-surface 112 and is referred to as the "cross-line" direction. The z-direction specifies the position of a point perpendicular to the xy-plane (i.e., perpendicular to the free-surface 112) with the positive z-direction pointing downward away from the free-surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free-surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free-surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may be composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 may be activated to produce an acoustic signal at spatial and/or temporal intervals. Activation of the source 104 is often called as a "shot." In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be three-dimensional (e.g., spherical) but are shown in vertical plane cross section in FIG. 1A. The outward and downward expanding portion of the pressure wavefield 136 is called the "primary wavefield," which eventually reaches the formation surface 122 of the subterranean formation 120, at which point the primary wavefield may be partially reflected from the formation surface 122 and partially refracted downward into the subterranean formation 120, becoming elastic waves within the subterranean formation 120. In other words, in the body of water, the acoustic signal is composed primarily of compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be considered a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, secondary waves of significant amplitude may be generally emitted from points on or close to the formation surface 122, such as point 138, and from points on or very close to interfaces in the subterranean formation 120, such as points 140 and 142.

The secondary waves may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media are traversed by the wave. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
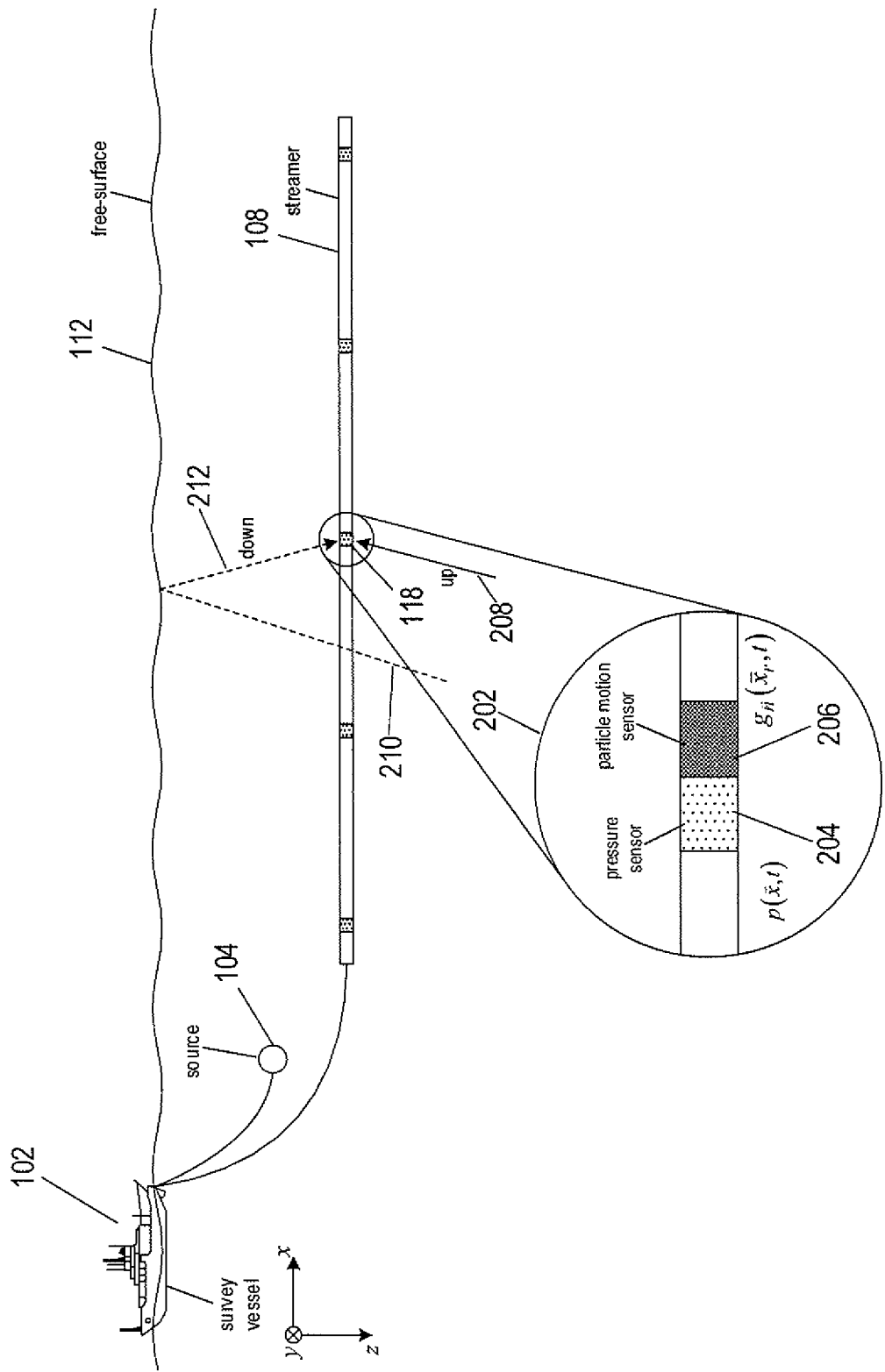
FIG. 2 shows a side-elevation view of a seismic data acquisition system with a magnified view of a receiver.

Each receiver 118 may be a multi-component sensor composed of one or more particle motion sensors that detect particle motion, velocities, or accelerations over time and a pressure sensor that detects variations in water pressure over time. FIG. 2 shows a side-elevation view of the seismic data acquisition system with a magnified view 202 of the receiver 118. In this example, the magnified view 202 reveals that the receiver 118 is a multi-component sensor composed of a pressure sensor 204 and a particle motion sensor 206. The pressure sensor may be, for example, a hydrophone. Each pressure sensor may measure changes in water pressure over time to produce pressure data denoted by $p(\vec{x}_r, t)$, where $\vec{x}_r$ represents the Cartesian coordinates $(x_r, y_r, z_r)$ of a receiver, subscript r is a receiver index, and t represents time. The particle motion sensors may be responsive to water motion. In general, particle motion sensors detect particle motion in a direction normal to the orientation of the particle motion sensor and may be responsive to such directional displacement of the particles, velocity of the particles, or acceleration of the particles. A particle motion sensor that measures particle motion generates particle motion data denoted by $g_{\vec{n}}(\vec{x}_r, t)$. A particle motion sensor that measures to particle velocity (i.e., particle velocity sensor) generates particle velocity data denoted by $v_{\vec{n}}(\vec{x}_r, t)$. A particle motion sensor that measures particle acceleration (i.e., accelerometer) generates particle acceleration data denoted by $a_{\vec{n}}(\vec{x}_r, t)$. The data generated by one type of particle motion sensor may be converted to another type during seismic data processing. For example, particle motion data may be differentiated to obtain particle velocity data, and the particle acceleration data may be integrated to obtain particle velocity data.

The particle motion sensors are typically oriented so that the particle motion is measured in the vertical direction (i.e., $\vec{n}=(0,0,z)$) in which case $v_z(\vec{x}_r, t)$ is called the vertical-velocity data and $a_z(\vec{x}_r, t)$ is called the vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r, t)$, each receiver may include a particle motion sensor that measures the wavefield in the in-line direction in order to obtain the inline velocity data, $v_x(\vec{x}_r, t)$, and a particle motion sensor that measures the wavefield in the cross-line direction in order to obtain the cross-line velocity data, $v_y($ $\vec{x}_r$, t). In certain implementations, the particle motion sensors may be omitted and the receivers may be composed of only pressure sensors.

The streamers 106-111 and the survey vessel 102 may include sensing electronics and data-processing facilities that allow seismic data generated by each receiver to be correlated with the time the source 104 is activated, absolute positions on the free-surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102. The pressure data and particle motion, velocity, or acceleration data represent pressure and particle motion wavefields and, therefore, may also be referred to as the pressure wavefield and particle motion, velocity, or acceleration wavefield, respectively.

Returning to FIG. 2, directional arrow 208 represents the direction of an up-going wavefield at the location of receiver 118 and dashed-line arrows 210 and 212 represent a down-going wavefield produced by reflection of an up-going wavefield from the free-surface 112 before reaching the receiver 118. In other words, the pressure wavefield measured by the pressure sensors is composed of an up-going pressure wavefield component and a down-going pressure wavefield component, and the particle motion wavefield measured by the particle motion sensors is composed of an up-going wavefield component and a down-going wavefield component. The down-going wavefield, also called the "ghost wavefield," interferes with the pressure and particle motion data generated by the receivers and creates notches in the seismic data spectral domain as explained below with reference to FIGS. 6 and 7.

As explained above, each pressure sensor 204 and particle motion sensor 206 generates seismic data that may be stored in data-storage devices located onboard the survey vessel. Each pressure sensor and particle motion sensor may include an analog-to-digital converter that converts time-dependent analog signals into discrete time series that consist of a number of consecutively measured values called "amplitudes" separated in time by a sample rate. The time series generated by a pressure or particle motion sensor is called a "trace," which may consist of thousands of samples collected at a typical sample rate of about 1 to 5 ms. A trace is a recording of a subterranean formation response to acoustic energy that passes from an activated source into the subterranean formation where a portion of the acoustic energy is reflected and/or refracted and ultimately detected by a sensor as described above. A trace records variations in a time-dependent amplitude that represents acoustic energy in the portion of the secondary wavefield measured by the sensor. The coordinate location of each time sample generated by a moving sensor may be calculated from global position information obtained from one or more global positioning devices located along the streamers, survey vessel, and buoys and the known geometry and arrangement of the streamers and sensors. A trace generated by a pressure or particle motion sensor is wavefield data that may be represented as a set of time-dependent amplitudes denoted by:

$$tr_r(t) = \{a_r(t_j)\}_{j=1}^{J} \quad (1)$$

where
j is a time sample index;
J is the number of time samples; and
$a_r(t_j)$ is the pressure or particle motion amplitude at time sample $t_j$.

For example, $p(\vec{x}_r, t)$ is the trace generated by a pressure sensor and $v_n(\vec{x}_r, t)$ is the trace generated by a vertical particle motion sensor. Each trace also includes a trace header not represented in Equation (1) that identifies the specific receiver that generated the trace, receiver GPS coordinates, and may include time sample rate and the number of samples.

As explained above, the secondary wavefield typically arrives first at the receivers located closest to the sources. The distance from the sources to a receiver is called the "source-receiver offset," or simply "offset," which creates a delay in the arrival time of a secondary wavefield from an interface within the subterranean formation. A larger offset generally results in a longer arrival time delay. The traces are collected to form a "gather" that can be further processed using various seismic data processing techniques in order to obtain information about the structure of the subterranean formation.

Figure 3:
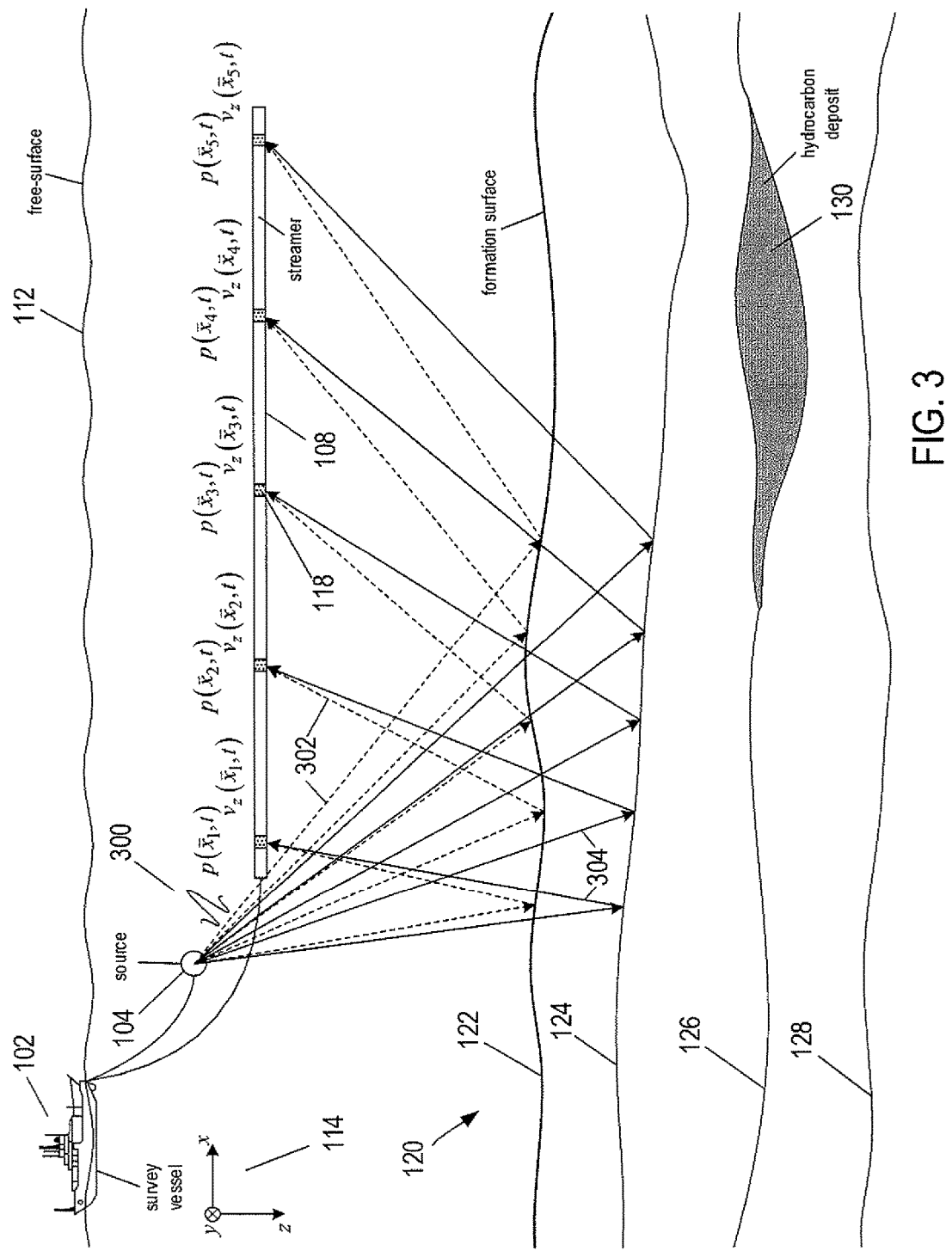
FIG. 3 shows example ray paths that represent paths of an acoustic signal that travels from a source into a subterranean formation.

FIG. 3 shows example ray paths of an acoustic signal 300 that travels from the first source 104 to or into the subterranean formation 120. Dashed-line rays, such as rays 302, represent acoustic energy reflected from the formation surface 122 to the receivers 118 located along the streamer 108, and solid-line rays, such as rays 304, represent acoustic energy reflected from the interface 124 to the receivers 118 located along the streamer 108. Note that for simplicity of illustration only a handful of ray paths are represented. Each pressure sensor may measure the pressure variation and each particle motion sensor may measure the particle motion, velocity, or acceleration of the acoustic energy reflected from the subterranean formation 120 or interfaces therein. In the example of FIG. 3, the particle motion sensors located at each receiver 118 measure vertical particle velocity of the wavefield emanating from the subterranean formation 120. The hydrostatic pressure data and/or particle motion data generated at each receiver 118 may be time sampled and recorded as separate traces. In the example of FIG. 3, the collection of traces generated by the receivers 118 along the streamer 108 for a single activation of the source 104 may be collected to form a "common-shot gather." The traces generated by the receivers located along each of the other five streamers for the same activation may be collected to form separate common-shot gathers, each gather associated with one of the streamers.

Figure 4:
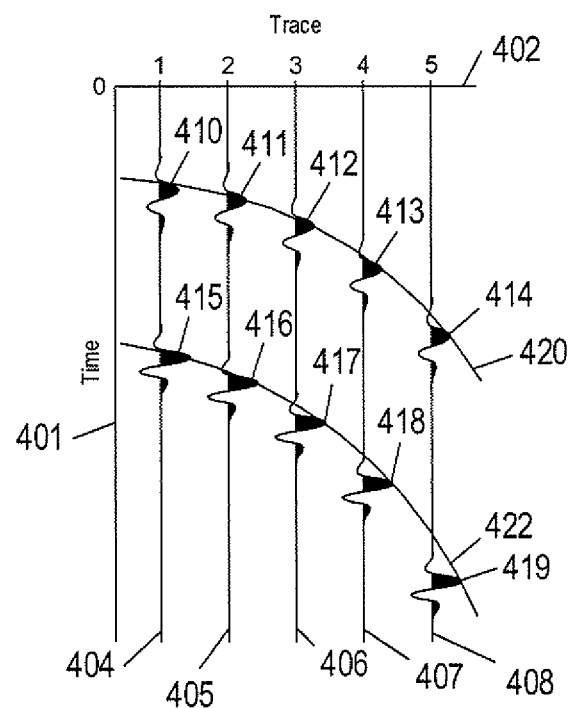
FIG. 4 shows a plot of a synthetic common-shot gather composed of example traces.

FIG. 4 shows a plot of a common-shot gather composed of example traces of the wavefield measured by the five receives located along the streamer 108 shown in FIG. 3. Vertical axis 401 represents time and horizontal axis 402 represents trace numbers with trace "1" representing the seismic data generated by the receiver 118 located closest to the source 104 and trace "5" representing the seismic data generated by the receiver 118 located farthest away from the source 104. The traces 404-408 may represent variation in the amplitude of either the pressure data or the particle motion data measured by corresponding sensors of the five receivers 118. The example traces include wavelets or pulses 410-419 that represent the up-going wavefield measured by the pressure sensors or particle motion sensors. Peaks, colored black, and troughs of each trace represent changes in the amplitude. The distances along the traces 404-408 from time zero to the wavelets 410-414 represent two-way travel time of the acoustic energy output from the source 104 to the formation surface 122 and to the receivers 118 located along the streamer 108, and wavelets 415-419 represents longer two-way travel time of the acoustic energy output from the source 104 to the interface 124 and to the same receivers 118 located along the streamer 108. The amplitude of the peak or trough of the wavelets 410-419 indicate the magnitude of the reflected acoustic energy recorded by the receivers 118.

The arrival times versus source-receiver offset is longer with increasing source-receiver offset. As a result, the wavelets generated by a formation surface or an interface are collectively called a "reflected wave" that tracks a hyperbolic curve. For example, hyperbolic curve 420 represents the hyperbolic distribution of the wavelets 410-414 reflected from the formation surface 122, which are called a "formation-surface reflected wave," and hyperbolic curve 422 represents the hyperbolic distribution of the wavelets 415-419 from the interface 124, which are called an "interface reflected wave."

Figure 5:
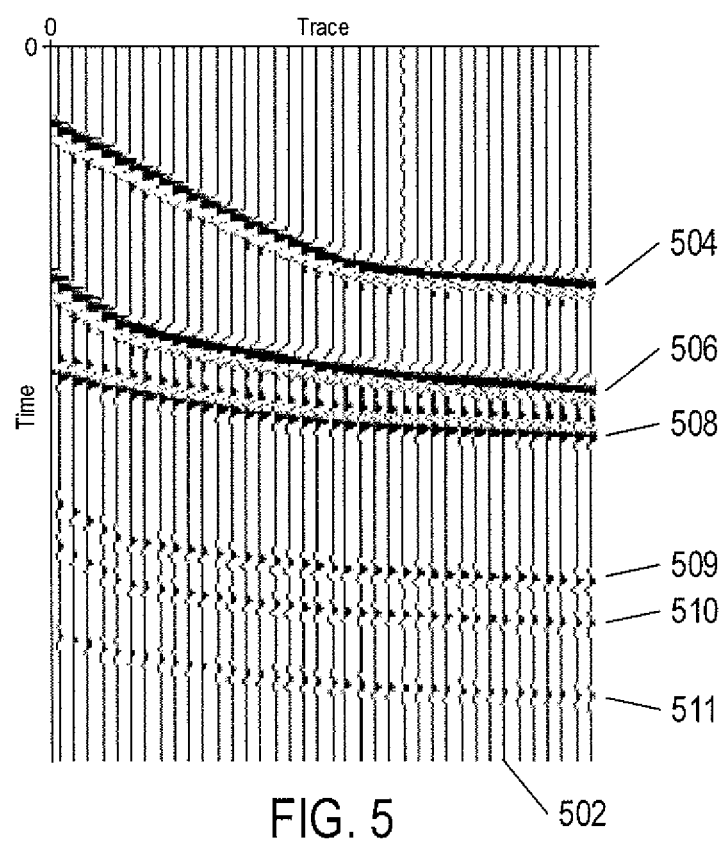
FIG. 5 shows an example expanded view of a synthetic gather composed of 38 traces.

FIG. 5 shows an expanded view of a gather composed of 38 traces. Each trace, such as trace 502, varies in amplitude over time and represents acoustic energy reflected from a subterranean formation surface and five different interfaces within the subterranean formation as measured by a pressure sensor or a particle motion sensor. In the expanded view, wavelets that correspond to reflections from the formation surface or an interface within the subterranean formation appear chained together to form reflected waves. For example, wavelets 504 with the shortest transit time represent a formation-surface reflected wave, and wavelets 506 represent an interface reflected wave emanating from an interface just below the formation surface. Reflected waves 508-511 represent reflections from interfaces located deeper within the subterranean formation.

The gather shown in FIG. 4 is sorted in a common-shot domain and the gather shown in FIG. 5 is sorted into a common-receiver domain. A domain is a collection of gathers that share a common geometrical attribute with respect to the seismic data recording locations. The seismic data may be sorted into any suitable domain for examining the features of a subterranean formation including a common-receiver domain, a common-receiver-station domain, or a common-midpoint domain.

In practice, pressure and vertical-velocity seismic data is typically contaminated with various types of noise and may record other adverse effects attributed to deviations in the seismic data acquisition system. The noise and adverse effects are collectively called "defects," which may have adverse downstream effects on any images ultimately generated from the seismic data.

Figure 6:
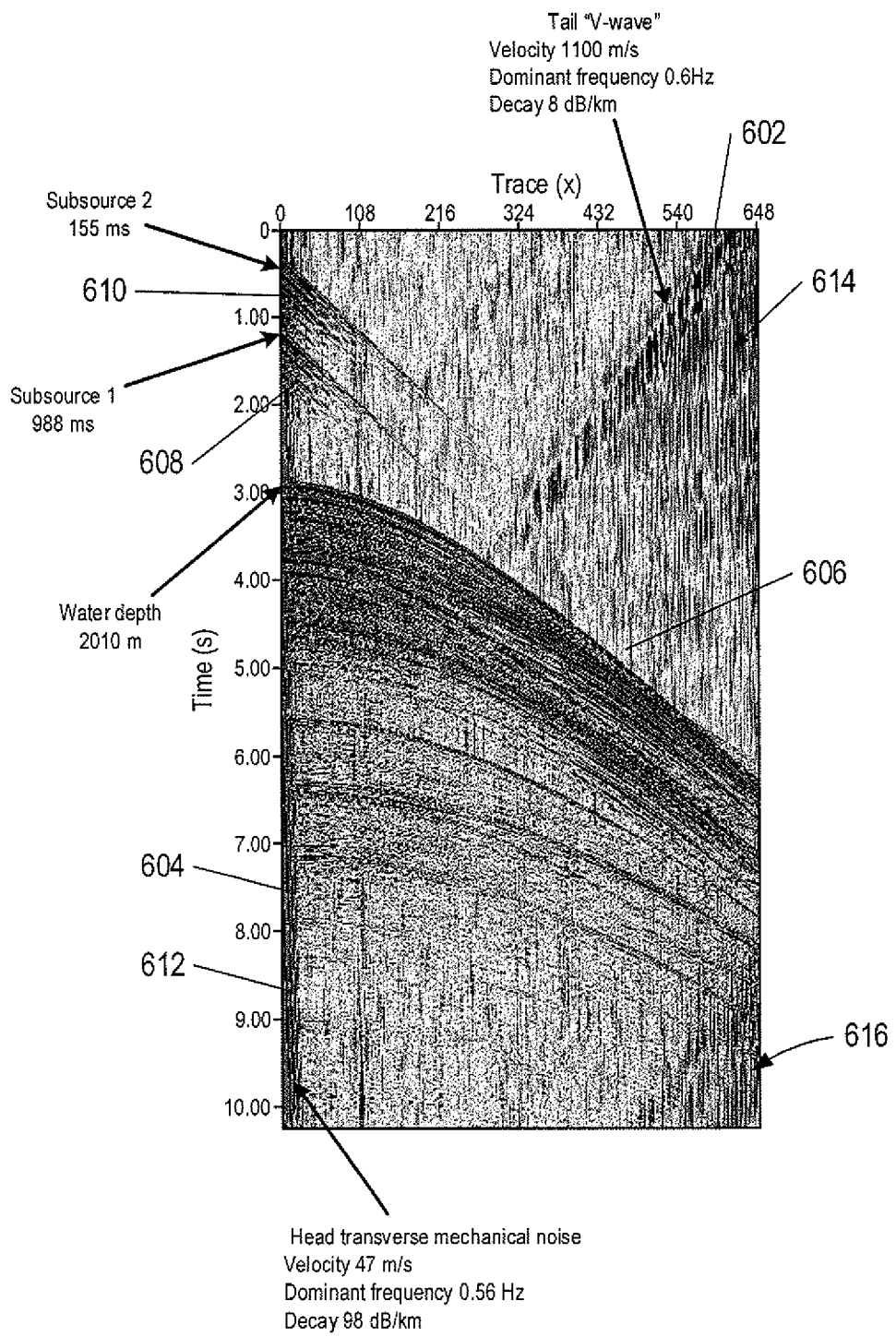
FIG. 6 shows a recorded pressure-wavefield gather of an actual pressure wavefield that includes various types of noise.

FIG. 6 shows a recorded pressure-wavefield gather of an actual pressure wavefield that includes various types of defects. The pressure wavefield was generated using a first source towed at a depth of about 5 meters below the free surface and fired at a time 988 ms after the start of recording, and a second source towed at a depth of about 9 meters below the free surface and fired at 155 ms. Horizontal axis 602 represents a trace or channel index along a streamer and vertical axis 604 represents time. Hyperbolic-shaped curves 606 beginning at about 3.00 seconds along the time axis 604 correspond to primary and multiple reflections of acoustic energy between the free-surface and a subterranean formation. The reflections include up-going and down-going wavefields described above with reference to FIG. 2. The pressure wavefield also records a direct arrival 608 associated with the first source and a direct arrival 610 associated with the second source. Pressure sensors located closest to the survey vessel (i.e., small number traces) record transverse mechanical noise 612 for the duration of the recorded pressure wavefield. The pressure wavefield also records tail "V-wave" noise 614 and 616.

Figure 7:
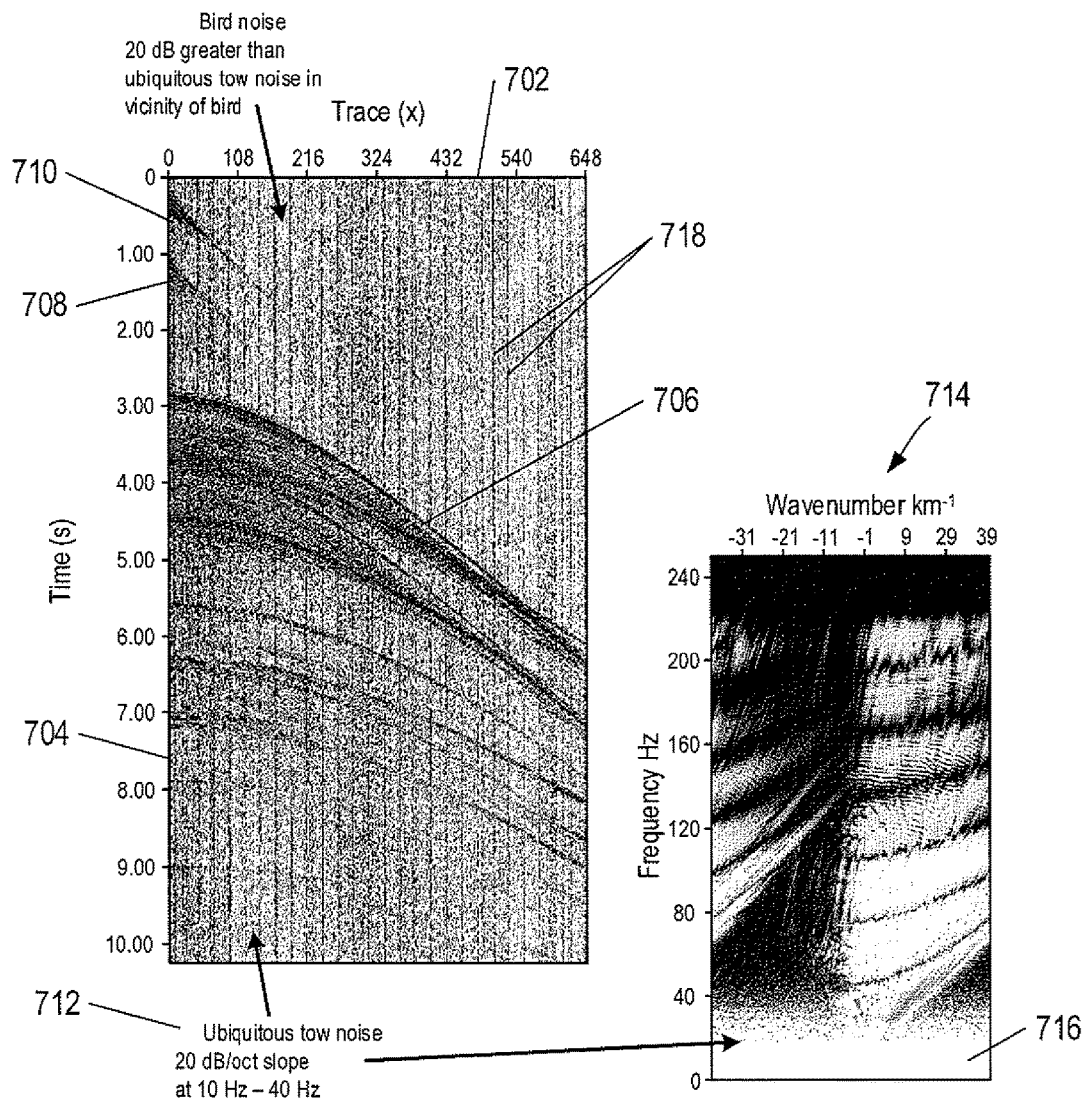
FIG. 7 shows a recorded vertical-velocity-wavefield gather of an actual vertical-velocity wavefield that includes various types of defects.

FIG. 7 shows a recorded vertical-velocity-wavefield gather of an actual vertical-velocity wavefield that includes various types of defects. The vertical-velocity wavefield was generated by particle motion sensors collocated with the pressure sensors along the same streamer used to generate the pressure-wavefield gather in FIG. 6. Horizontal axis 702 represents a trace or channel index along the steamer and vertical axis 704 represents time. Like the pressure-wavefield, the vertical-velocity wavefield also shows hyperbolic-shaped curves 706 beginning at about 3.00 seconds along the time axis 704 that correspond to primary and multiple reflections of acoustic energy between the free-surface and a subterranean formation. The vertical-velocity wavefield also records a direct arrival 708 associated with the first source and a direct arrival 710 associated with the second source. To a greater extent than the pressure wavefield shown in FIG. 6, the vertical-velocity wavefield records tow noise 712 (i.e., streamer vibrational noise) that appears as speckles or light shading throughout the vertical-velocity-wavefield gather. FIG. 7 includes a wavenumber-frequency domain plot 714 produced by transforming the vertical-velocity wavefield from the space-time domain to the wavenumber-frequency domain using a Fourier transform. The wavenumber-frequency domain plot 714 reveals tow noise as white shading 716 in a frequency range below about 40 Hz. The tow noise is typically measured at a lower amplitude by pressure sensors and therefore does not appear as noise in the space-time and wavenumber-frequency domain representations of the pressure wavefield in FIG. 6. In FIG. 7, the vertical-velocity wavefield also includes "bird noise" created by depth controllers (also called "birds") attached to the streamers at regularly spaced intervals. Bird noise is recorded as regularly spaced striations 718 for the duration of the vertical-velocity wavefield. The striations 718 correspond to the regularly spaced locations of the depth controllers along the streamer.

FIGS. 6 and 7 illustrate only a fraction of the types of defect that may actually contaminate seismic data recorded during a marine survey. As shown in FIGS. 6 and 7, certain types of noise are recorded to some degree by pressure and particle motion sensors while other types of noise are recorded almost exclusively by either pressure sensors or particle motion sensors.

FIG. 8 shows a side-elevation view of an example marine seismic-data acquisition system 800 that includes a survey vessel 802 towing a source 804 and streamers 806 above a formation 808. FIG. 9 displays an inexhaustive list of various types of actual acquisition-system attributes that are characteristic of a typical marine survey. The term "actual" refers to real measurable and quantifiable parameters or quantities obtained from measurements at the time of the survey. The actual acquisition-system attributes listed in FIG. 9 are categorized as source attributes, receiver attributes, and noise attributes. The source and receiver attributes are position and engineering characteristics of the acquisition system as measured by onboard systems, such as the coordinate locations and depths of the source elements (e.g., air guns) and receivers. The noise attributes include categories of mechanically propagated noise, acoustic noise, and electrical noise. The actual acquisition-system attributes may be specified prior to carrying out a marine survey and/or measured during the marine survey.

Returning to FIG. 8, the same actual acquisition-system attributes associated with the marine seismic-data acquisition system 800 may be transmitted (e.g., via satellite communications) to an on-shore seismic data processing facility 810. Now the actual configuration of the formation 808 is unknown and the effects of the actual acquisition-system attributes would have on an estimate of the formation, produced from seismic data recorded by the seismic-data acquisition system 800, are unknown. Methods described below receive as input the actual acquisition-system attributes and apply forward modeling and error estimation on an Earth model, such as Earth model 812, to compute in near real-time synthetic seismic data without defects based on defect-free acquisition system attributes and seismic data with defects resulting from selected actual acquisition-system attributes. The example Earth model 812 includes a free-surface 814, a horizontal formation surface 816, and a horizontal interface 818. Forward modeling and error estimation are applied in near real-time and may be used at any point of seismic-data acquisition on board the survey vessel 802 and/or at the seismic data processing facility 810 to predict the effects one or more actual acquisition-system attributes would have on actual seismic data. Methods enable QC personnel on board the survey vessel 802 and/or at the seismic data processing facility 810 to assess each defect in isolation or in combination with other defects and decide on mitigating actions during or prior to the start of the survey.

Figure 10:
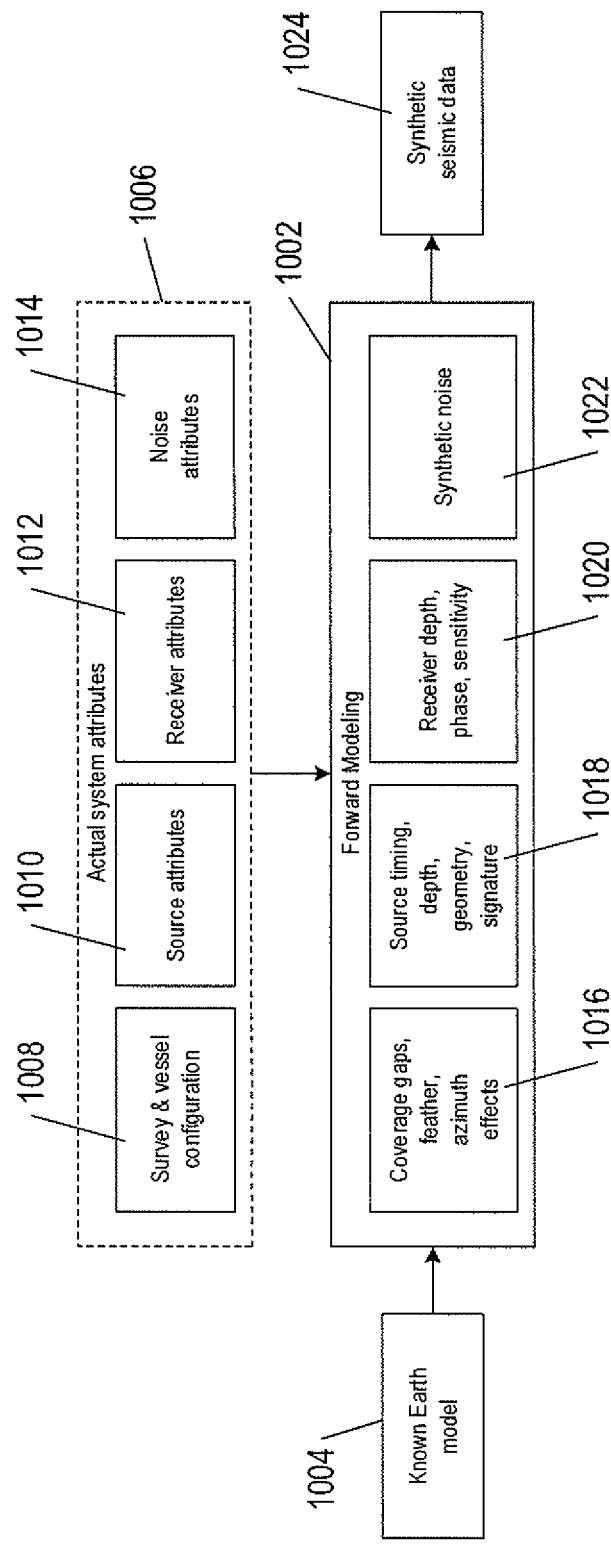
FIG. 10 shows an example of forward modeling used to generate synthetic seismic data from an Earth model and actual acquisition-system attributes.

FIG. 10 shows an example of forward modeling used to generate synthetic seismic data from an Earth model and actual acquisition-system attributes of a marine survey. Forward modeling 1002 receives as input an Earth model 1004 and defect-free actual acquisition-system attributes 1006. The Earth model 1004 may be a single spike that represents a formation surface or an interface of a subterranean formation. The Earth model 1004 may be a two- or three-dimensional model of a formation located below a body of water and composed of a horizontal formation surface and any number of horizontal interfaces between layers of different thicknesses with defined properties which may include seismic velocity, density, and an inverse rate of signal attenuation ("Q"), such as the Earth model 812 shown in FIG. 8. The Earth model 1004 may be a more complicated two- or three-dimensional model of a formation located below a body of water that may include dips, irregularly shaped surfaces, and variations in seismic velocity, density, and inverse rate of signal attenuation Q. The acquisition-system attributes 1006 include the survey and vessel configuration 1008, source attributes 1010, receiver attributes 1012, and noise attributes 1014. The survey vessel configuration 1008 includes information about the characteristics and type of survey vessel. The source attributes 1010, receiver attributes 1012, and noise attributes 1014 includes all or part of the actual acquisition-system attributes listed in FIG. 9.

Forward modeling 1002 computes the Earth model's response that would be measured by receivers configured and operated according to the receiver attributes 1012 to seismic energy generated by a source configured and operated according to the source attributes 1010. Forward modeling 1002 includes a series of computational sub-modeling operations, such as coverage modeling 1016, source response modeling 1018, receiver response modeling 1020, and synthetic noise modeling 1022. Coverage modeling 1016 computationally models coverage gaps, streamer feathering, and azimuth effects based on the source and receiver positions. Source response modeling 1018 models operations of the source based on source timing, depth, geometry, and source-element signatures (e.g., notional source signatures) determined from the source attributes. Receiver response modeling 1020 models receiver depth, phase, and sensitivity based on the receiver attributes. Synthetic noise modeling 1022 uses the noise attributes 1014 to parameterize a noise model based on library functions for the various types of noise listed in FIG. 9.

Forward modeling 1002 produces synthetic seismic data 1024, such as a synthetic pressure wavefield and/or a synthetic vertical-velocity wavefield. The synthetic seismic data 1024 may include defects based on certain selected actual source attributes, receiver attributes, and noise attributes of the actual acquisition-system attributes. For example, suppose forward modeling 1002 receives as input the Earth model 812 shown in FIG. 8 and certain actual acquisition-system attributes listed in FIG. 9 are selected. Forward modeling 1002 may be used to compute a synthetic pressure wavefield and a synthetic vertical-velocity wavefield that represent the response a subterranean formation with the same structure as the Earth model 812 would have to activation of the source 804. The synthetic pressure and vertical-velocity seismic data would include defects that result from the selected actual acquisition-system attributes.

Methods enable the defects produced by actual acquisition-system attributes to be assessed in isolation or in combination with other defects by allowing QC personnel to select actual acquisition-system attributes as input to forward modeling 1002. FIGS. 11A-11D illustrates input of selected actual acquisition-system attributes 1006 to forward modeling 1002. In the example of FIGS. 11A-11D, forward modeling 1002 receives the Earth model 1004 and the actual acquisition-system attributes are selected for input. Individual acquisition-system attributes are denoted by $A_1$, $A_2$, ..., $A_N$. For example, $A_i$ may represent a type of streamer noise and $A_{i+1}$ may represent source depth. In this example, forward modeling 1002 generates synthetic pressure seismic data 1102 and synthetic vertical-velocity seismic data 1104. Forward modeling 1002 may be used to generate the synthetic pressure seismic data 1102 and synthetic vertical-velocity seismic data 1104 in a particular domain. For example, the synthetic pressure seismic data 1102 and synthetic vertical-velocity seismic data 1104 may be sorted into a common-shot domain, common-midpoint domain, common-receiver-station domain, or common-receiver domain.

Figure 11A:
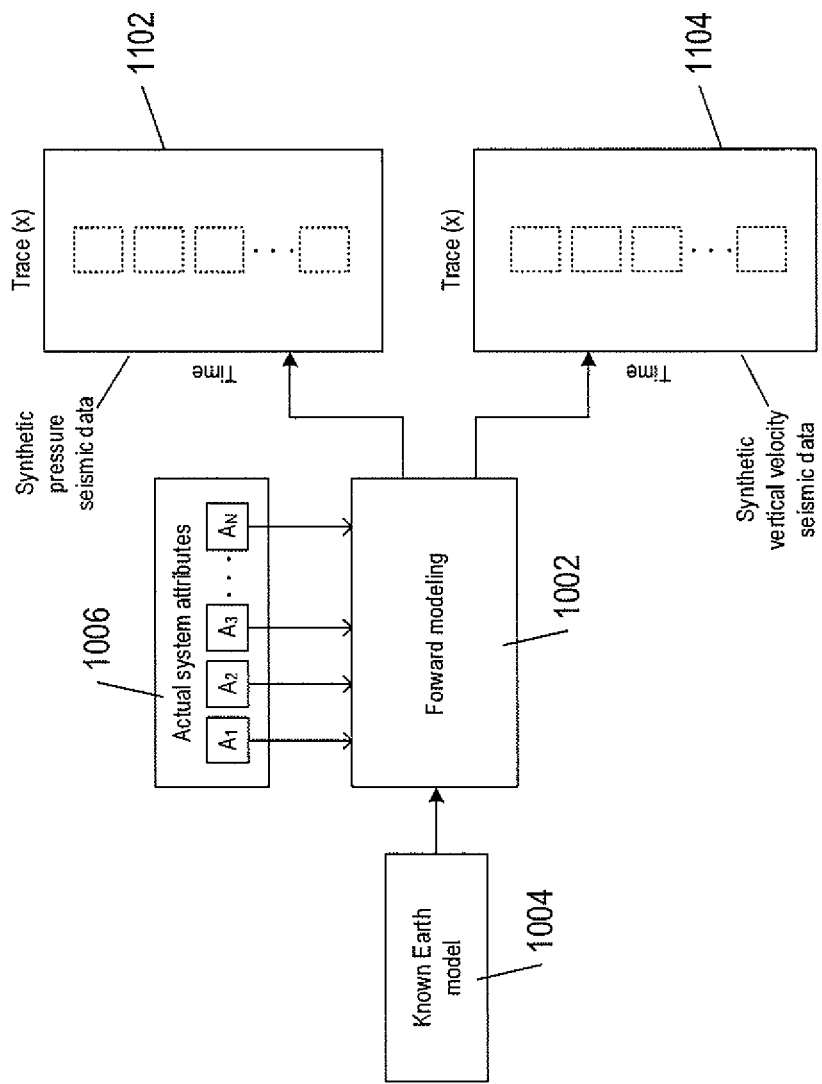
FIGS. 11A-11D illustrate input of selected actual acquisition-system attributes to forward modeling.
Figure 11B:
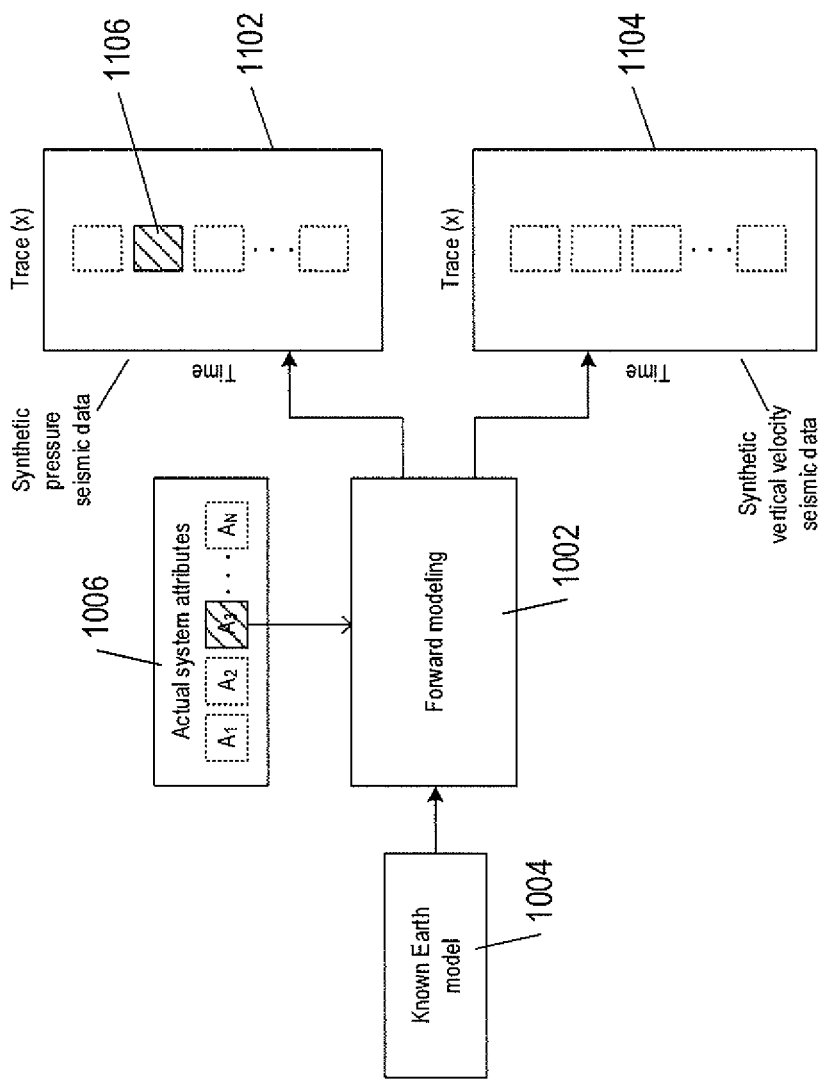
Figure 11C:
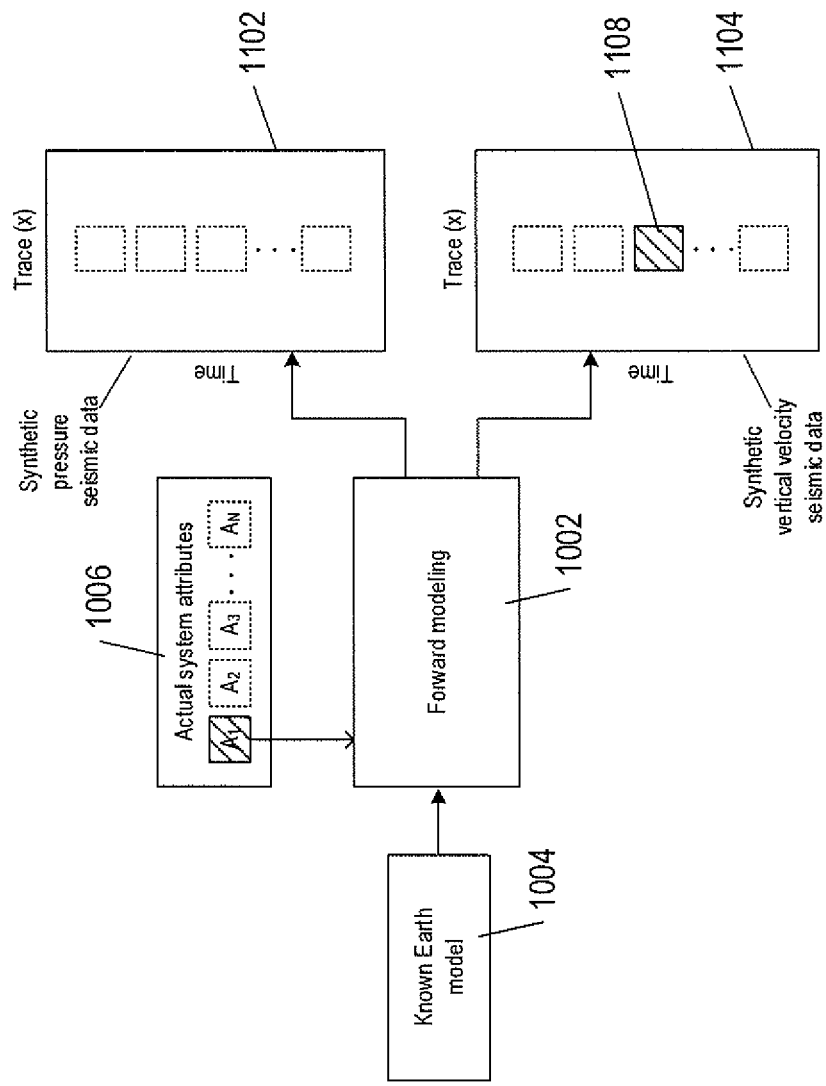
Figure 11D:
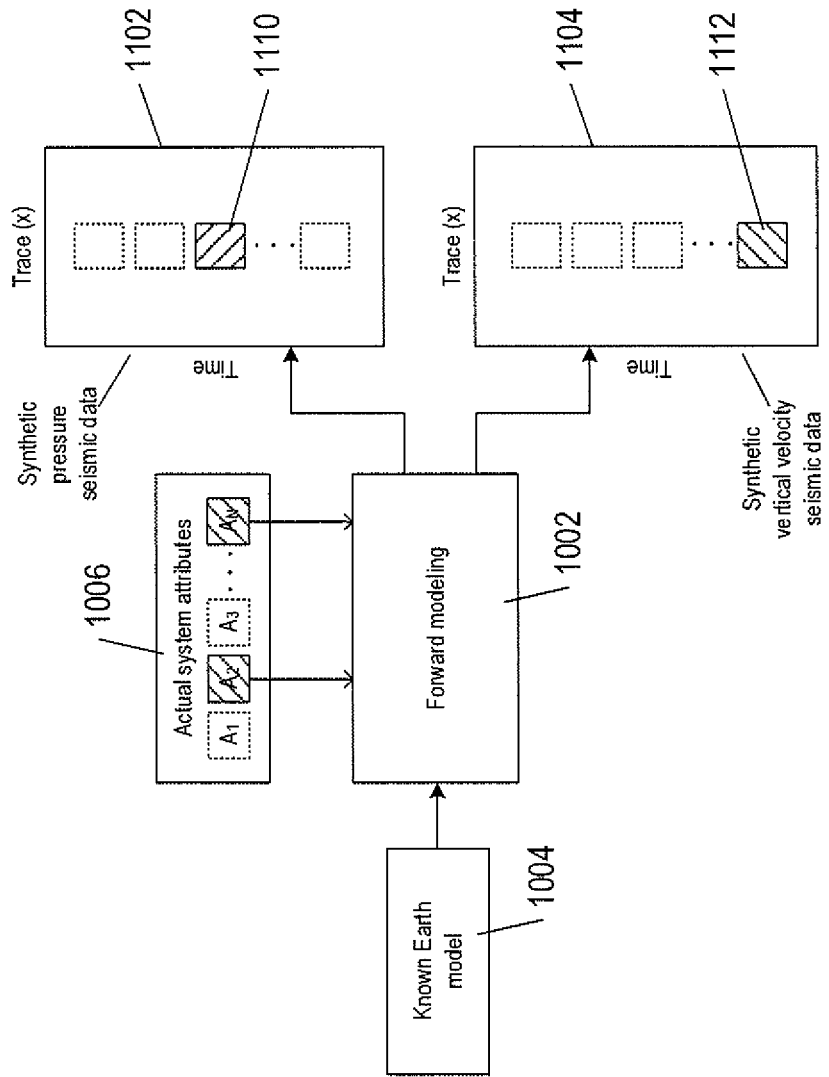

As shown in FIGS. 11A-11D, the individual actual acquisition-system attributes may be selected by QC personnel. Shaded and unshaded boxes in the synthetic seismic data 1102 and 1104 are used to represent turning particular actual acquisition-system attribute "on" or "off." When an actual acquisition-system attribute is not selected, the default defect-free acquisition-system attribute is input. For example, in FIG. 11A, all of the acquisition-system attributes are turned "off" (i.e., all boxes are un-shaded). As a result, the synthetic seismic data 1102 and 1104 are generated with default defect-free acquisition-system attributes. As a result, the synthetic seismic data 1102 and 1104 do not contain any of the defects that would be produced by the actual acquisition-system attributes. When one or more actual acquisition-system attributes are turned "on," the turned "on" actual acquisition-system attributes are input to forward modeling 1002 and defect-free acquisition-system attributes associated with turned "off" acquisition-system attributes are input to forward modeling 1002. In FIG. 11B, individual actual acquisition-system attributes $A_3$ is turned "on," which results in a defect 1106 in the synthetic pressure seismic data 1102. For example, turned "off" actual acquisition-system attributes $A_3$ may represent forward modeling 1002 performed with straight streamers having no coverage holes, while turned "on" actual acquisition-system attribute $A_3$, as shown, may represent forward modeling 1002 performed with actual streamer shapes with feather. In FIG. 11C, individual actual acquisition-system attributes $A_1$ is turned "on," which results in a defect 1108 in the synthetic vertical-velocity seismic data 1104. For example, turned "off" actual acquisition-system attributes $A_1$ may represent forward modeling 1002 performed with constant nominal source separation, while turned "on" actual acquisition-system attribute $A_1$, as shown, may represent forward modeling 1002 performed with actual source geometry variation. In FIG. 11D, individual actual acquisition-system attributes $A_2$ and $A_N$ are both turned "on" which result in corresponding defect 1110 in the synthetic pressure seismic data 1102 and defect 1112 in the synthetic vertical-velocity seismic data 1104. For example, turned "off" actual acquisition-system attributes $A_2$ and $A_N$ may represent forward modeling 1002 performed with no tow noise and no bird noise, while turned "on" actual acquisition-system attribute $A_2$ and $A_N$, as shown, may represent forward modeling 1002 performed with actual tow noise and actual bird noise. Individual actual acquisition-system attributes that result in defects in both of the synthetic seismic data 1102 and 1104 may be input to forward modeling 1002.

Figure 12:
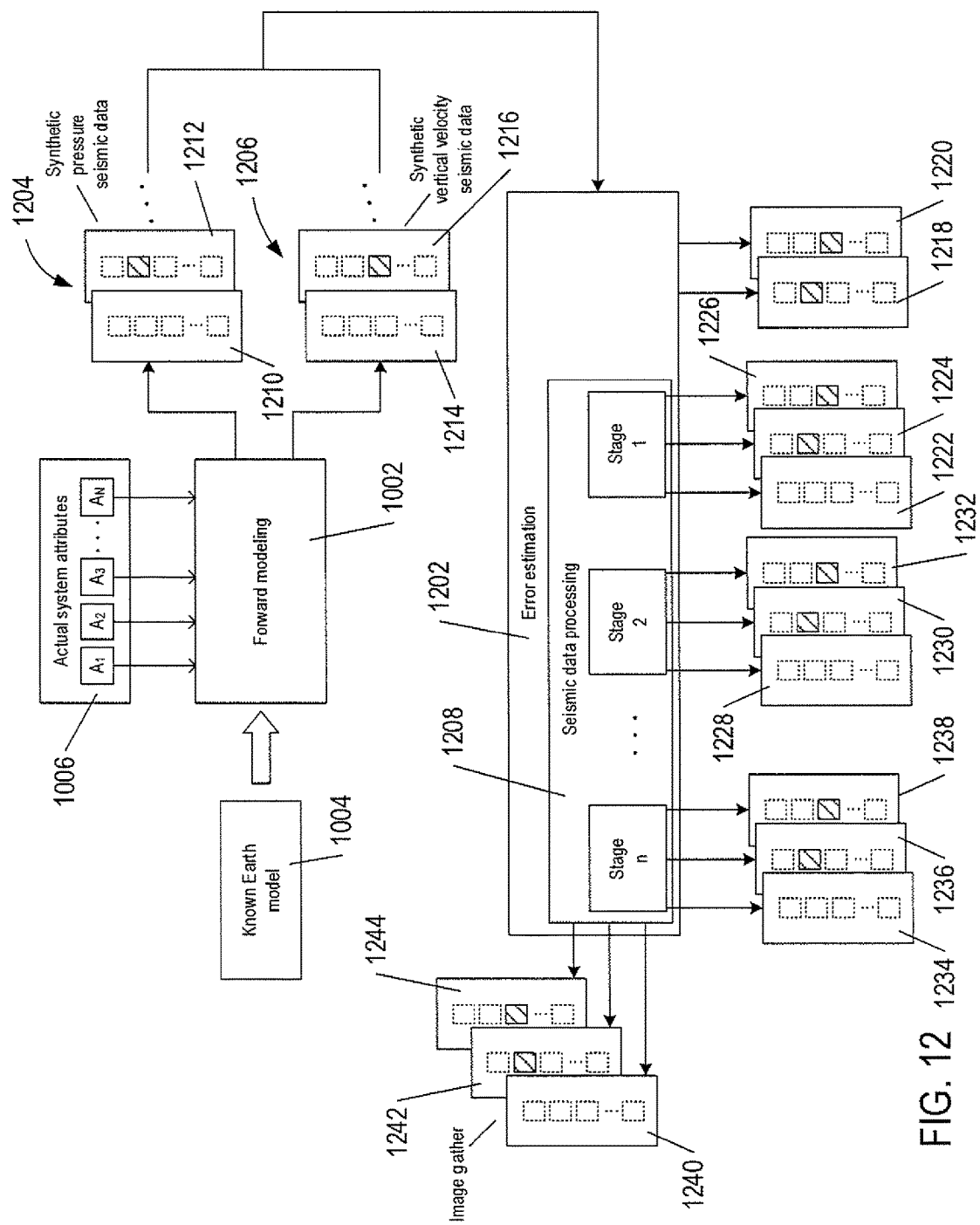
FIG. 12 shows an example of error estimation applied to synthetic seismic data.

FIG. 12 shows an example of error estimation 1202 applied to the synthetic pressure seismic data 1204 and synthetic vertical-velocity seismic data 1206 at different stages of seismic data processing 1208. The different stages of seismic data processing 1208 are identified as stage 1, stage 2, through stage n. For example, stage 1 may represent seismic data conditioning and denoising or a particular aspect of conditioning and denoising. Stage 2 may represent receiver-side deghosting in which either the pressure wavefield or vertical velocity wavefield is separated into up-going and down-going wavefields. The up-going pressure wavefield or up-going vertical velocity wavefield is the receiver-deghosted wavefield used in subsequent stages of seismic data processing. Other intermediate stages of seismic data processing 1208 may include, but are not limited to, source-side deghosting, domain sorting, normal moveout ("NMO"), dip moveout ("DMO"), stacking, filtering, multiple removal, velocity analysis, time migration, and depth migration. The final stage, stage n, may apply an imaging condition to generate an image gather. Error estimation 1202 may be used to generate processed synthetic seismic data at different stages of seismic data processing in order to assess defects in isolation or in combination and assess propagation of defects at different stages of seismic data processing.

FIG. 12 provides an example of how error estimation 1202 may be used to track two defects propagated through seismic data processing 1208. Forward modeling 1002 may be used to generate synthetic pressure seismic data without defects 1210 and synthetic pressure seismic data with a first defect 1212. Forward modeling 1002 may also be used to generate synthetic vertical-velocity seismic data without defects 1214 and synthetic vertical-velocity seismic data with a second defect 1216. Error estimation 1202 may be used to compute the difference 1218 between synthetic pressure seismic data 1210 and 1212 and the difference 1220 between synthetic vertical-velocity seismic data 1214 and 1216. Error estimation 1202 may be used to output processed synthetic seismic data with and without defects at selected stages of seismic data processing 1208. For example, at stage 1 of seismic data processing 1208, denoised and conditioned synthetic seismic data without defects 1222 and denoised and conditioned synthetic seismic data with the first defect 1224 and with the second defect 1226 may be output. At stage 2 of seismic data processing 1208, a receiver-deghosted wavefield (i.e., up-going wavefield) without defects 1228 may be computed from the synthetic pressure and vertical-velocity seismic data 1210 and 1214, a receiver-deghosted wavefield with the first defect 1230 may be computed from synthetic pressure and vertical-velocity seismic data 1212 and 1214, and a receiver-deghosted wavefield with the second defect 1232 may be computed from synthetic pressure and vertical-velocity seismic data 1210 and 1216. Stage n may be used to compute depth migrated synthetic seismic data without defects 1234, depth migrated synthetic seismic data with the first defect 1236, and depth migrated synthetic seismic data with the second defect 1238. Error estimation 1202 directs seismic data processing 1208 to compute image gathers 1240, 1242, and 1244. Image gather 1240 is free of defects and is computed from the original synthetic seismic data 1210 and 1214 without defects. Image gather 1242 includes the first defect which is computed from the synthetic seismic data 1212 and 1214. Image gather 1244 includes the second defect which is computed from the synthetic seismic data 1210 and 1216.

Error estimation 1202 allows one or more defects to be tracked and measured at different stages of seismic data processing 1208. For example, processed synthetic seismic data 1218, 1224, 1230, 1236, and 1242 with the first defect are output at intermediate stages of seismic data processing. QC personnel may compare the synthetic seismic data 1218, 1224, 1230, 1236, and 1242 with the first defect with the synthetic seismic data 1218, 1222, 1228, 1234, and 1240 without defects in order to assess the effects of the first defect at intermediate stages of seismic data processing.

Error estimation 1202 may also use metrics to quantitatively assess the difference between processed synthetic seismic data without defects and processed synthetic seismic data with one or more defects. A first example of a metric that may be used is the root mean square error:

$$\text{RMS}_r = \sqrt{\frac{\sum_{j=1}^{J}\left(b_r(t_j) - b_r^{def}(t_j)\right)^2}{J}} \qquad (2)$$

where
$\text{RMS}_r$ is root mean square ("RMS") error between the r-th channel of seismic data without defects and seismic data with one or more defects;
$b_r(t_j)$ is the amplitude at channel r and time sample $t_j$ of the seismic data without defects;
$b_r^{def}(t_j)$ is the amplitude at channel r and time sample $t_j$ of the seismic data with one or more defects; and
J is the number of time samples in each trace.
The metric in Equation (2) may be used to quantitatively assess how one or more defects effect the seismic data at intermediate stages of seismic data processing. For example, Equation (2) may be used to compute RMS error between processed synthetic seismic data 1222 and 1224, RMS error between processed synthetic seismic data 1228 and 1230, RMS error between processed synthetic seismic data 1234 and 1236, and RMS error between image gathers 1240 and 1242. The RMS errors may then be compared to assess propagation of the first defect at different stages of seismic data processing 1208.

When an overall amplitude difference is revealed by the RMS error, the amplitude difference between $b_r^{def}(t_j)$ and $b_r(t_j)$ may be further broken down into a function that expresses the amplitude difference at each individual frequency. For example, any overall amplitude difference revealed by the RMS error may be further quantified as a function of amplitude dB difference versus frequency, by transforming the amplitudes $b_r^{def}(t_j)$ and $b_r(t_j)$ to the frequency domain to obtain $B_r^{def}(\omega)$ and $B_r(\omega)$, respectively, using a Fourier transform, where $\omega$ is the angular frequency, and computing the ratio $|B_r^{def}(\omega)|/|B_r(\omega)|$ over the frequency domain.

A second example of a metric that may be used to quantitatively assess the difference between processed synthetic seismic data without defects and processed synthetic seismic data with one or more defects is cross-correlation. Cross correlation may be used as a measure of similarity between two traces at the same channel of the processed synthetic seismic data with and without defects as a function of a time-lag. In particular, the cross-correlation between a trace $\{b_r(t_j)\}_{j=1}^{J}$ of the processed synthetic seismic data without defects and a trace $\{b_r^{def}(t_j)\}_{j=1}^{J}$ processed synthetic seismic data with one or more defects for the same channel r at time-lag k is given by:

$$CC_r(k) = \frac{1}{2J-1}\sum_{j=1}^{J} b_r(t_j) b_r^{def}(t_{k+j}) \quad (3)$$

where $k=0, 1, \ldots, J-1$.

The largest $CC_r(k)$ value gives an estimate of overall similarity between the two traces, and the lag k of the largest $CC_r(k)$ value corresponds to the overall time shift (linear phase difference) between the two traces. Any phase difference more complicated than an overall time shift may be quantified as a function of phase difference versus frequency by determining the phase spectrum of $CC_r(k)$.

The effects of synthetic defects may also be quantified at arbitrary stages beyond imaging. For example, in inversion, the calculated synthetic error terms from image gathers may be propagated into consequent errors in amplitude-versus-offset measurements and acoustic impedance estimates based on those gathers. In another example, in quantitative interpretation, the errors in estimated acoustic impedance may be further propagated to determine the degree to which they degrade the likelihood of classifying lithology and pore fluid correctly.

Figure 13:
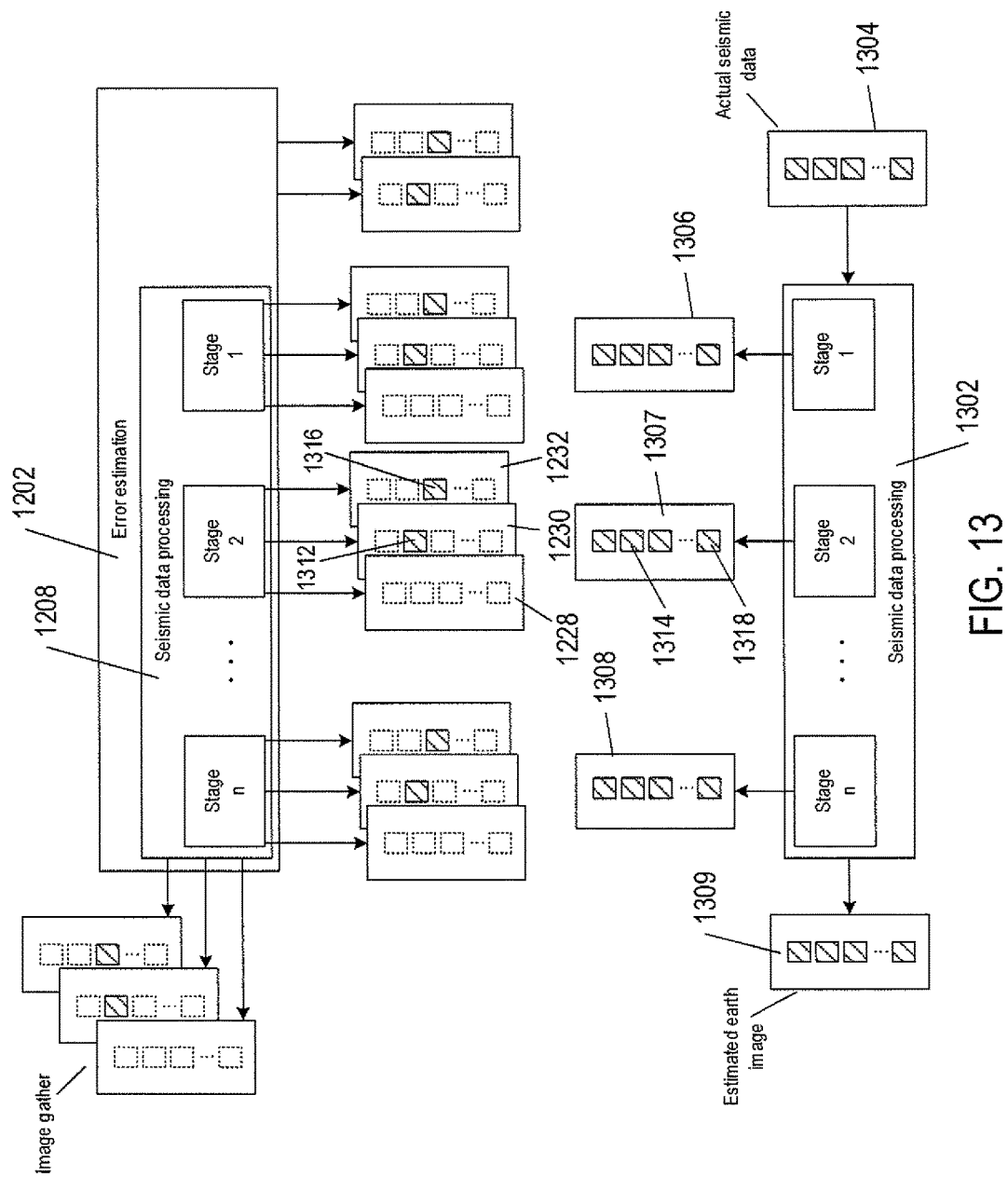
FIG. 13 shows an example comparison of processed synthetic seismic data output at intermediate stages of seismic data processing with processed actual seismic data output at the same stages of seismic data processing.

Synthetic seismic data computed at intermediate stages of seismic data processing 1208 may also be compared with processed actual seismic data computed at the same stages of seismic data processing of actual seismic data in order to understand quantitatively propagation of defects through intermediate stages of processing. FIG. 13 shows an example comparison of the processed synthetic seismic data output at intermediate stages of seismic data processing 1208 with processed actual seismic data output at the same stages of seismic data processing 1302 applied to actual seismic data 1304. In the example of FIG. 13, seismic data 1304 generated by receivers during seismic data processing is input to seismic data processing 1302. The seismic data 1304 is measured using the same receivers, sources, and under the same conditions recorded in the actual acquisition-system attributes 1006 input to forward modeling 1002 in FIG. 12. For example, seismic data 1304 may include pressure seismic data generated by pressure sensors and/or vertical-velocity seismic data generated by collocated particle motion sensors. Processed synthetic seismic data output at each stage of seismic data processing 1208 may be used to predict how defects should affect the processed actual seismic data output at the same stages of seismic data processing 1302. Processed actual seismic data 1306-1309 represent seismic data output at different stages of seismic data processing 1302. Processed actual seismic data includes a number of defects, represented by shaded boxes, acquired during seismic data acquisition. The processed actual seismic data 1306-1309 may be compared to the processed synthetic seismic data output from seismic data processing 1208. For example, processed seismic data 1307 represents receiver-side deghosted wavefield output at stage 2 of seismic data processing 1302, which may be compared with processed synthetic seismic data 1228, 1230, and 1232. In particular, the first defect 1312 in processed synthetic seismic data 1230 may be used to identify and predict defect 1314 in processed seismic data 1307 and defect 1316 may be used to identify and predict defect 1318 in processed seismic data 1307.

Differences between actual and synthetic processed seismic data may not typically be compared directly by subtraction or other metrics because the differences are not indicative purely of the effects of acquisition defects, because the actual seismic data is based on a response from an actual subterranean formation while synthetic seismic data is based on a simulated Earth model response. But, the effects can be quantified independently on the actual and synthetic processed seismic data and then the results may be compared. For example, suppose the amplitude spectrum of actual pressure data in an actual image gather has 6 dB less signal content at 10 Hz than pressure data acquired on the other side of the survey. It is also determined that due to a loss of control, the streamers were towed 1 meter shallower than they were on the other side of the survey. The question arises whether the defect in acquisition accounts entirely for the observed feature in the actual seismic data, and whether reshooting the vessel track would be an effective mitigating action. Without forward modeling and error estimation in near real-time as described above, it is not possible to determine without ambiguity and before the vessel is committed to its next line whether the data should be reacquired. But by using forward modeling and error estimation in near real-time as described above, the expected drop in signal for the Earth model 1004 and seismic data processing 1208 may be quantified by dividing the signal amplitude in the defect-bearing result 1242 from forward modeling 1002 with the real depth 1 m shallower than specified by the acquisition design, by the corresponding signal amplitude in the defect-free result 1240 from forward modeling 1002 with the depth at a fixed value as specified by the acquisition design. If the expected drop in signal predicted by these means is substantially less than 6 dB, this suggests that the anomaly is a feature of the Earth, the amplitude treatment in the processing route, or an aspect of the acquisition other than the receiver depth. Consider another example in which a burst of low frequency swell noise is present in the actual seismic pressure data, and it is desirable to know in the course of designing the processing flow the effect the noise has on the data at each stage of seismic data processing 1208. Starting with the synthetic seismic data 1210 and 1212 obtained by forward modeling 1002, the synthetic seismic data 1222-1244 may be generated after noise attenuation, after wavefield separation, and after pre-stack migration with all noise sources present including the swell noise, and also with the swell noise component alone switched "off". RMS comparison between the "on" and "off" cases after noise attenuation yields a value for the proportion of the noise at that stage which is attributable solely to residual, poorly attenuated swell noise. RMS comparison after wavefield separation yields the corresponding value after bandwidth manipulation operations have boosted any such residual noise. RMS comparison in the image gathers yields an estimate of the degree to which integration by the migration operator mitigates the effects of the noise. Because the residual, unattenuated swell noise is not separable from the other noise terms in the actual seismic data, the immediate availability of a synthetic model with terms for each actual noise attribute in isolation is of utility in understanding the capabilities and limitations of each stage in a given processing approach.

Because synthetic seismic data may be computed with particular defects, QC personnel are better informed as to whether or not a particular defect observed in processed actual seismic data is an acquisition defect, a seismic processing problem, or an actual feature of the Earth, because the corresponding synthetic processed seismic data may be used to quantify which defects are expected from the known actual acquisition-system attributes and therefore may be used to determine whether the defect is actually expected or unexpected.

Processed synthetic seismic data computed at intermediate stages of seismic data processing 1208 may be compared with processed actual seismic data computed at the same stages of seismic data processing 1302 of actual seismic data in order to confirm the validity of assumptions and parameters used to compute processed synthetic seismic data from processed actual seismic data. For example, suppose actual seismic data shows a larger inverse rate of signal attenuation Q than the inverse rate of signal attenuation Q factor used in forward modeling 1002 (i.e., actual subterranean formation has a lower attenuation rate than the Earth model). The larger Q is observed as deeper signal penetration in actual seismic data 1304 than would be observed in synthetic seismic data 1204 and 1206. This same deeper penetration may also be observed when processed actual seismic data is compared with the processed synthetic seismic data output at the same stages of seismic data processing. As a result, any conclusions drawn from the processed synthetic seismic data regarding the relative impact of different acquisition defects may be discarded and the Q used with the Earth model may be recalibrated in accordance with the observed Q and forward modeling 1002 repeated.

The production imaging process from SEGD through receiver-side deghosting, preprocessing, demultiple, and depth migration using actual seismic data is in effect decoupled from the process of acquisition design, execution, defect analysis and line acceptance. Processing parameter choice is better informed, given an analysis of synthetic seismic data. Comparisons between processed actual and synthetic seismic data generated at intermediate stages of seismic data processing may be used to assess seismic data acquisition problems.

Methods and systems described above reduce a bandwidth bottleneck between data available onboard the survey vessel and data available at an onshore facility. With forward modeling 1002 and error estimation 1202 performed on an Earth model with actual acquisition-system attributes as input, as described above, there is no bandwidth bottleneck due seismic data transmission from the survey vessel to the onshore facility because the total number of bytes associated with the actual acquisition-system attributes is thousands of times smaller than raw actual seismic data. For example, suppose QC is to be performed at an onshore facility using actual seismic data. At a transmission rate of 256 kbit/s ($2^{15}$ byte/s) it would take about 68 minutes (approximately $2^{12}$ seconds) to transmit a complete single shot record (approximately $2^{27}$ bytes) of compressed, raw actual seismic data from the survey vessel to the onshore facility. On the other hand, it would take about 1 second to transmit $2^{15}$ bytes of compressed, actual acquisition-system attributes from the survey vessel to the onshore facility, which is about three orders of magnitude faster, and significantly exceeds the rate at which seismic data are acquired. The fast data transmission from the survey vessel to the onshore facility enables forward modeling 1002 and error estimation 1202 to be performed near-simultaneously onboard the survey vessel and/or at the onshore facility in order to maximize the amount of useful information with only a small, fixed amount of data and the synthetic seismic data output is sufficiently representative to perform useful activities, such as QC and parameter testing.

Figure 14:
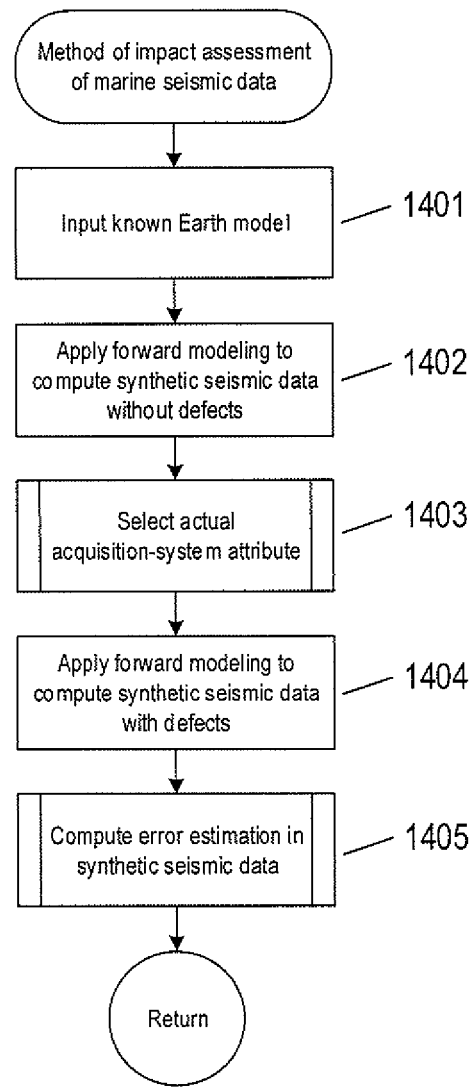
FIG. 14 shows a flow diagram of a method to assess the impact of defects in marine seismic data.

FIG. 14 shows a flow diagram of a method to assess the impact of defects in marine seismic data. In block 1401, an Earth model is received, as described above with reference to FIG. 8. The Earth model may be a spike, a model of a subterranean formation with a flat formation surface located a fixed depth below a free-surface and having at least one flat subterranean interface, or the Earth model may be a more complex model with an irregular shaped formation surface located below a free-surface and having at least one irregularly shaped flat subterranean interface with dips. The Earth model may also include seismic velocities, densities, and inverse rates of signal attenuation Q. In block 1402, forward modeling is applied to the Earth model to compute synthetic seismic data based on defect-free acquisition-system attributes, as described above with reference to FIGS. 10 and 11A. The synthetic seismic data without defects may be a synthetic pressure seismic data, synthetic vertical-velocity seismic data, or synthetic pressure seismic data and synthetic vertical-velocity seismic data associated with collocated pressure and particle motion sensors. In block 1403, a routine "select actual acquisition-system attributes" is called so that one or more actual acquisition-system attributes may be selected as input to subsequent block 1404. The one or more actual acquisition-system attributes include engineering configuration characteristics and coordinates of the acquisition system components as measured by onboard systems and includes noise characteristics determined from recorded seismic data, as described above with reference to FIG. 9. In block 1404, forward modeling is applied to the known Earth with the one or more actual acquisition-system attributes selected in block 1403 as input to compute synthetic seismic data with defects, as described above with reference to FIGS. 10 and 11B-11D. The synthetic seismic data with defects may be a synthetic pressure seismic data, synthetic vertical-velocity seismic data, or synthetic pressure seismic data and synthetic vertical-velocity seismic data associated with collocated pressure and particle motion sensors. In block 1405, a routine "compute error estimate in synthetic seismic data" is called to assess the effect of defects selected in block 1403 in the synthetic seismic data.

Figure 15:
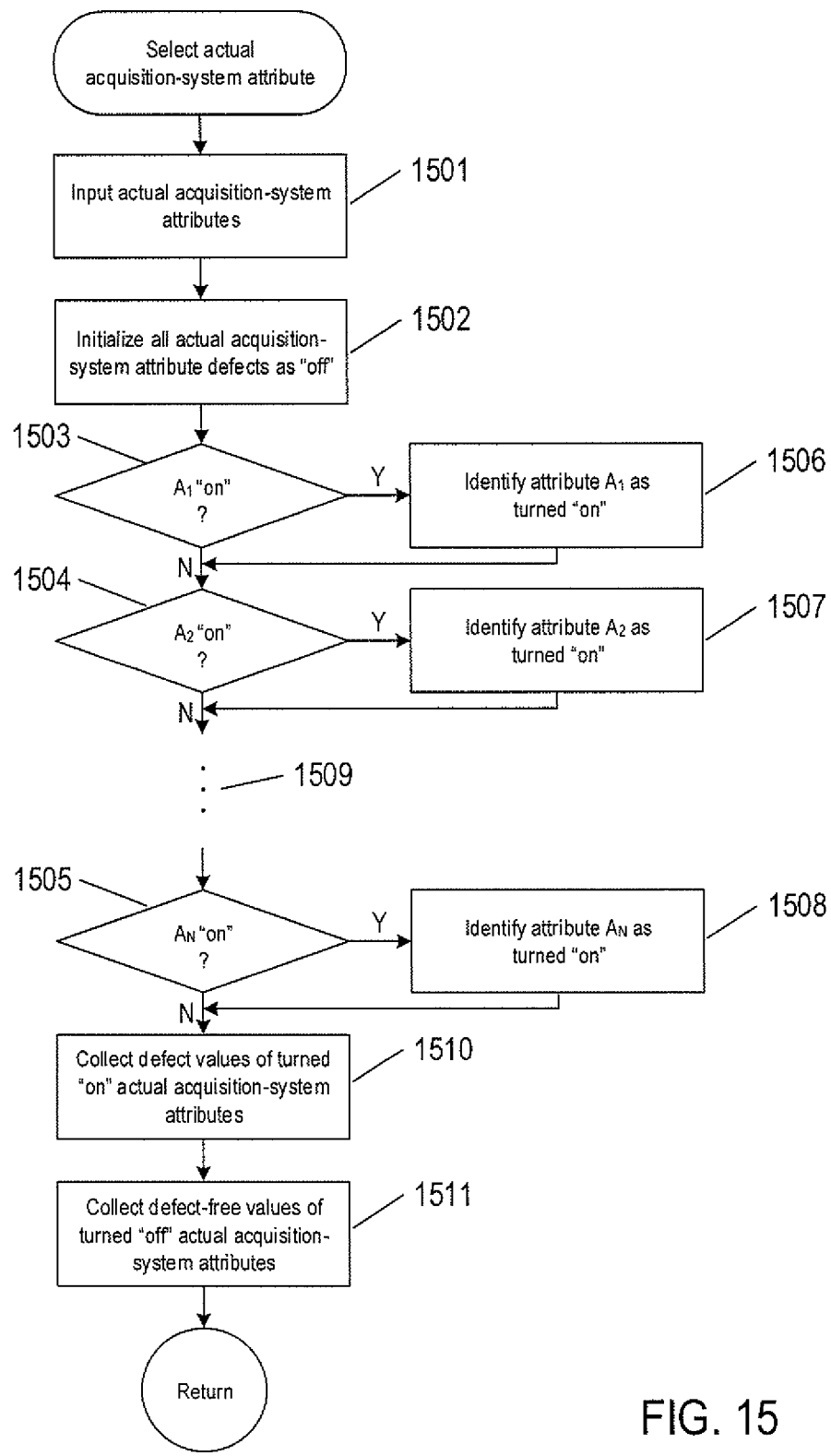
FIG. 15 shows a control-flow diagram of a routine "select actual acquisition-system attributes" called in the flow diagram of FIG. 14.
Figure 16:
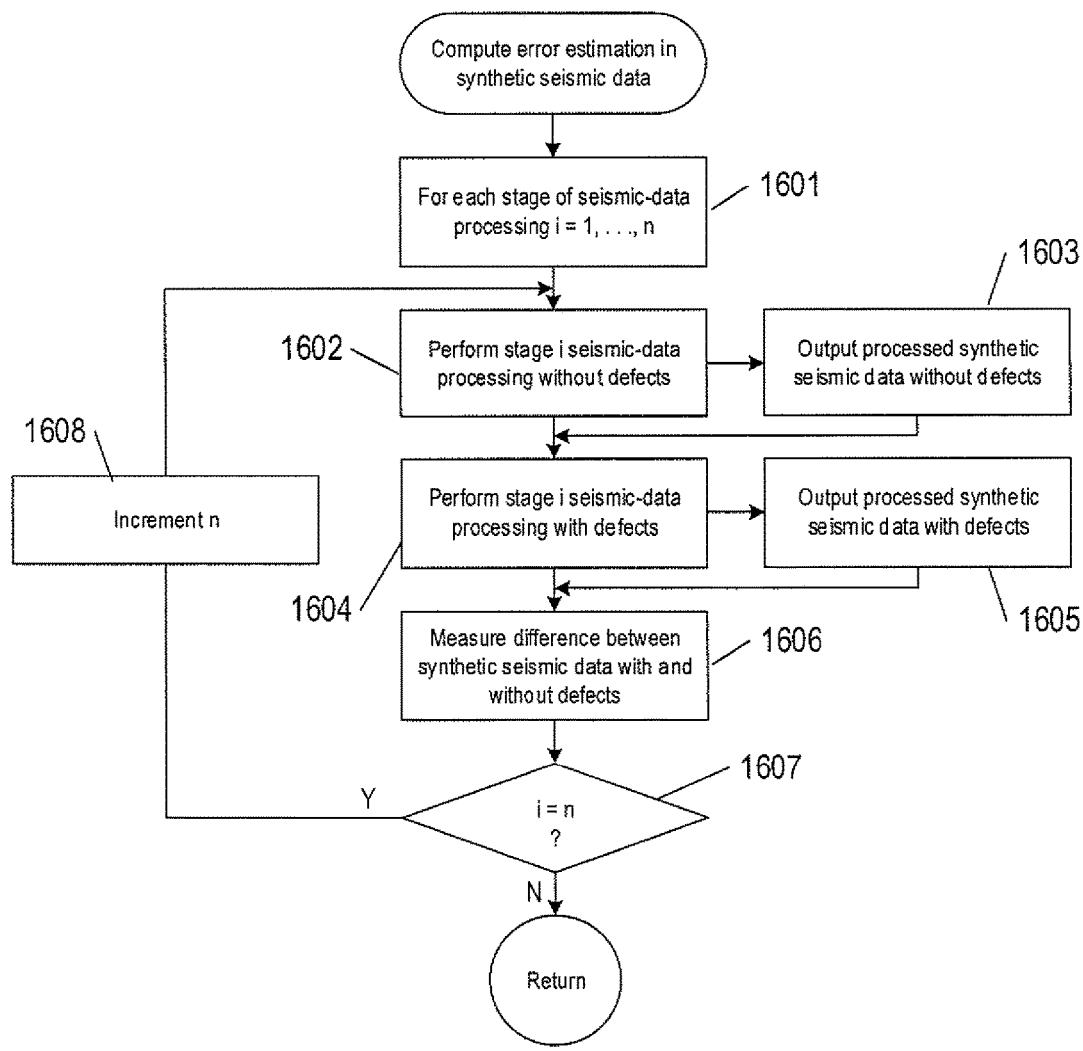
FIG. 16 shows a control-flow diagram of a routine "assess defects in synthetic seismic data" called in the flow diagram of FIG. 14.

FIG. 15 shows a control-flow diagram of the routine "select actual acquisition-system attributes" called in block 1403 of FIG. 14. In block 1501, the actual acquisition-system attributes are received as input. In block 1502, status of the actual acquisition-system attributes are initialized as "unselected." FIG. 14 shows decision blocks 1503-1505 that represents QC personnel selection of individual actual acquisition-system attributes denoted by $A_1, A_2, \ldots, A_N$, as described above with reference to FIG. 11. When an attribute is selected, blocks 1506-1508 represent identifying the attribute as turned "on." For example, in decision block 1503, when attribute $A_1$ is selected control flows to block 1506 in which the status of the attribute $A_1$ is changed from "off" to "on." Ellipsis 1509 represents a series of decision blocks and blocks in which the status of the attributes $A_3, \ldots, A_{N-1}$ may be turned from "off" to "on," as described above with reference to FIGS. 11A-11D. For example, the operations represented by blocks 1503-1509 may be displayed in a graphical user interface that enables QC personnel to turn "on" individual attributes by "clicking on" defect values associated with the acquisition-system attributes used to generate the synthetic seismic data. Otherwise, when individual attributes are left turned "off," defect-free values associated with the acquisition-system attribute are used to generate the synthetic seismic data. In block 1510, the defect values of the actual acquisition-system attributes associated with the turned "on" attributes are retrieved from a data-storage device. In block 1511, the defect-free actual acquisition-system attributes associated with turned "off" attributes are retrieved from a data-storage device FIG. 16 shows a control-flow diagram of the routine "compute error estimate in synthetic seismic data" called in block 1406 of FIG. 14. A for-loop beginning with block 1601 represents execution of each stage of seismic data processing represented by blocks 1602-1608. The stages of seismic data processing are denoted by stage i, where i is an index used to distinguish n different stages of seismic data processing, as described above with reference to FIG. 12. In block 1602, stage i of seismic data processing is carried out on seismic data without defects to generate processed synthetic seismic data. In block 1603, the processed synthetic seismic data is output. For example, the processed synthetic seismic data may be displayed. In block 1602, stage i of seismic data processing is carried out on seismic data without defects to generate processed synthetic seismic data without defects. In block 1603, the processed synthetic seismic data without defects may be output. For example, the processed synthetic seismic data without defects may be displayed. In block 1604, stage i of seismic data processing is carried out on seismic data with defects to generate processed synthetic seismic data with defects. In block 1605, the processed synthetic seismic data with defects may be output. For example, the processed synthetic seismic data with defects may be displayed. In block 1606, the difference between the synthetic seismic data with defects and the synthetic seismic data without defects is measured. For example, the difference may be measured based on RMS amplitude error, timing difference, or amplitude and phase errors as a function of frequency, as described above with reference to Equation (2). In decision block 1607, when index i does not equal the number of stages n, control flows to block 1608, otherwise, the for-loop terminates.

Figure 17:
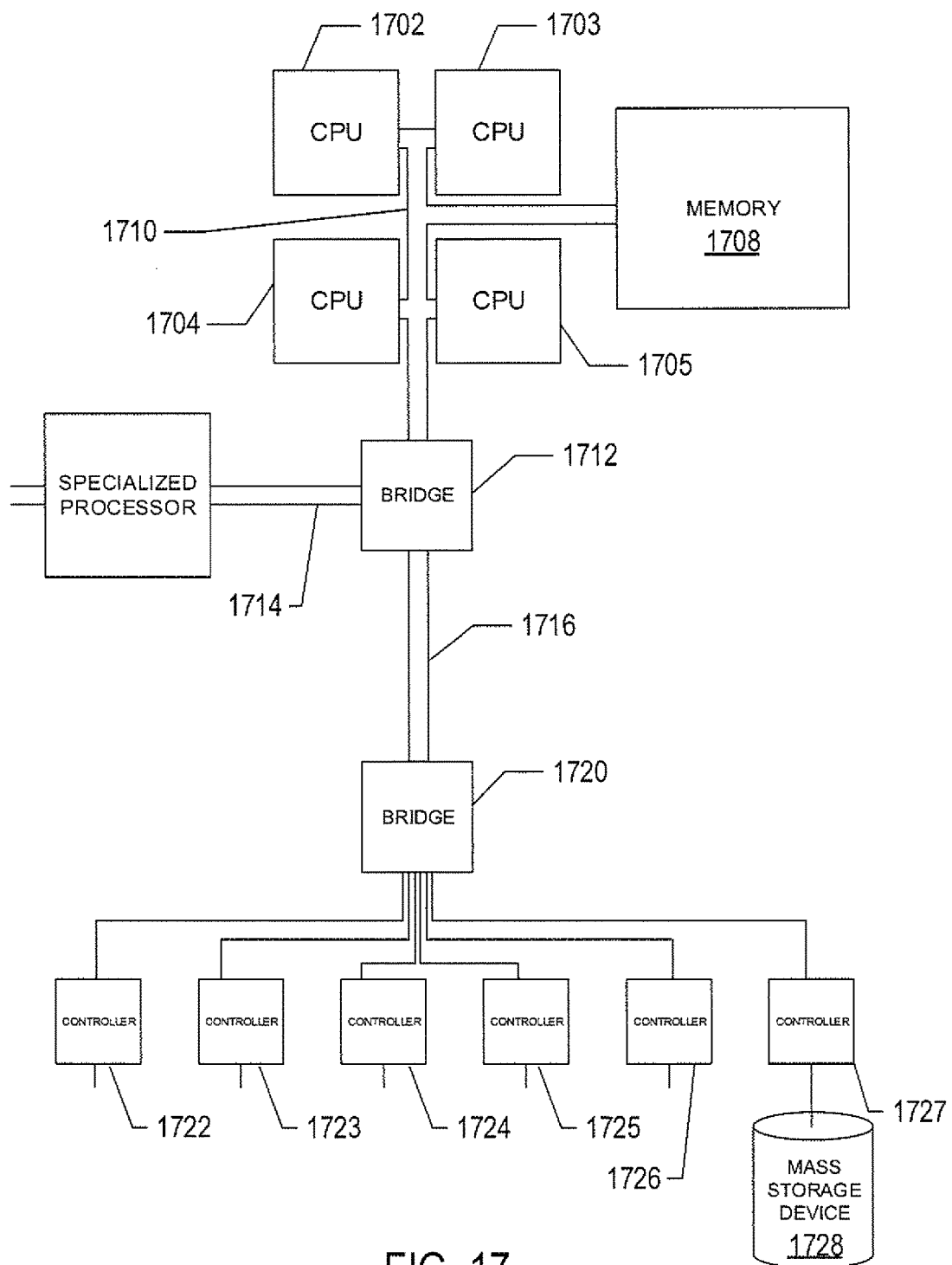
FIG. 17 shows an example of a computer system programmed to execute efficient methods of computing approximate vertical particle velocity wavefields.

FIG. 17 shows an example of a computer system programmed to assess defects in seismic data and therefore represents a geophysical-analysis data-processing system. The internal components of many small, mid-sized, and large computer systems as well as specialized processor-based storage systems may be described with respect to this generalized architecture, although each particular system may feature many additional components, subsystems, and similar, parallel systems with architectures similar to this generalized architecture. The computer system contains one or multiple central processing units ("CPUs") 1702-1705, one or more electronic memories 1708 interconnected with the CPUs by a CPU/memory-subsystem bus 1710 or multiple busses, a first bridge 1712 that interconnects the CPU/memory-subsystem bus 1710 with additional busses 1714 and 1716, or other types of high-speed interconnection media, including multiple, high-speed serial interconnects. The busses or serial interconnections, in turn, connect the CPUs and memory with specialized processors, such as a graphics processor 1718, and with one or more additional bridges 1720, which are interconnected with high-speed serial links or with multiple controllers 1722-1727, such as controller 1727, that provide access to various different types of computer-readable media, such as computer-readable medium 1728, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1728 is a data-storage device, including electronic memory, optical or magnetic disk drive, USB drive, flash memory and other such data-storage device. The computer-readable medium 1728 can be used to store machine-readable instructions that encode the computational methods described above and can be used to store encoded data, during store operations, and from which encoded data can be retrieved, during read operations, by computer systems, data-storage systems, and peripheral devices.

FIGS. 18-22 show results obtained from applying the methods described above to synthetic seismic data and processed synthetic seismic data output at different stages of seismic data processing. The Earth model used to generate the results displayed in FIGS. 18-22 consists of a simple mixture of primary and multiple reflection events, and the noise model is based on library functions representing several types of mechanical noise, parameterised by noise attribute values as described above with reference to FIGS. 6 and 7. In principle, a model of arbitrary complexity could have been used, including variations in seismic velocity, density and Q, plane layer dip, complex structure relating to a specific survey, reflected, refracted and diffracted events. In the absence of an Earth structural model tailored to a specific survey, the model may be chosen to represent important known aspects of the anticipated data set, such as the water depth and velocity profile, while making generic assumptions regarding other parameters such as maximum dip and Q. In seismic data processing of the actual seismic data acquired from an actual marine survey, it may be difficult to determine the true velocities and Q of the Earth, and to determine precisely which energy is primary signal and which comprises residual terms from other seismic sources, multiples, source and receiver ghosts, and noise. In analysis of the synthetic data, there is no such ambiguity, because the properties of the Earth model are perfectly known and the contribution of each term to the energy in the processed gather is known in isolation.

Figure 18:
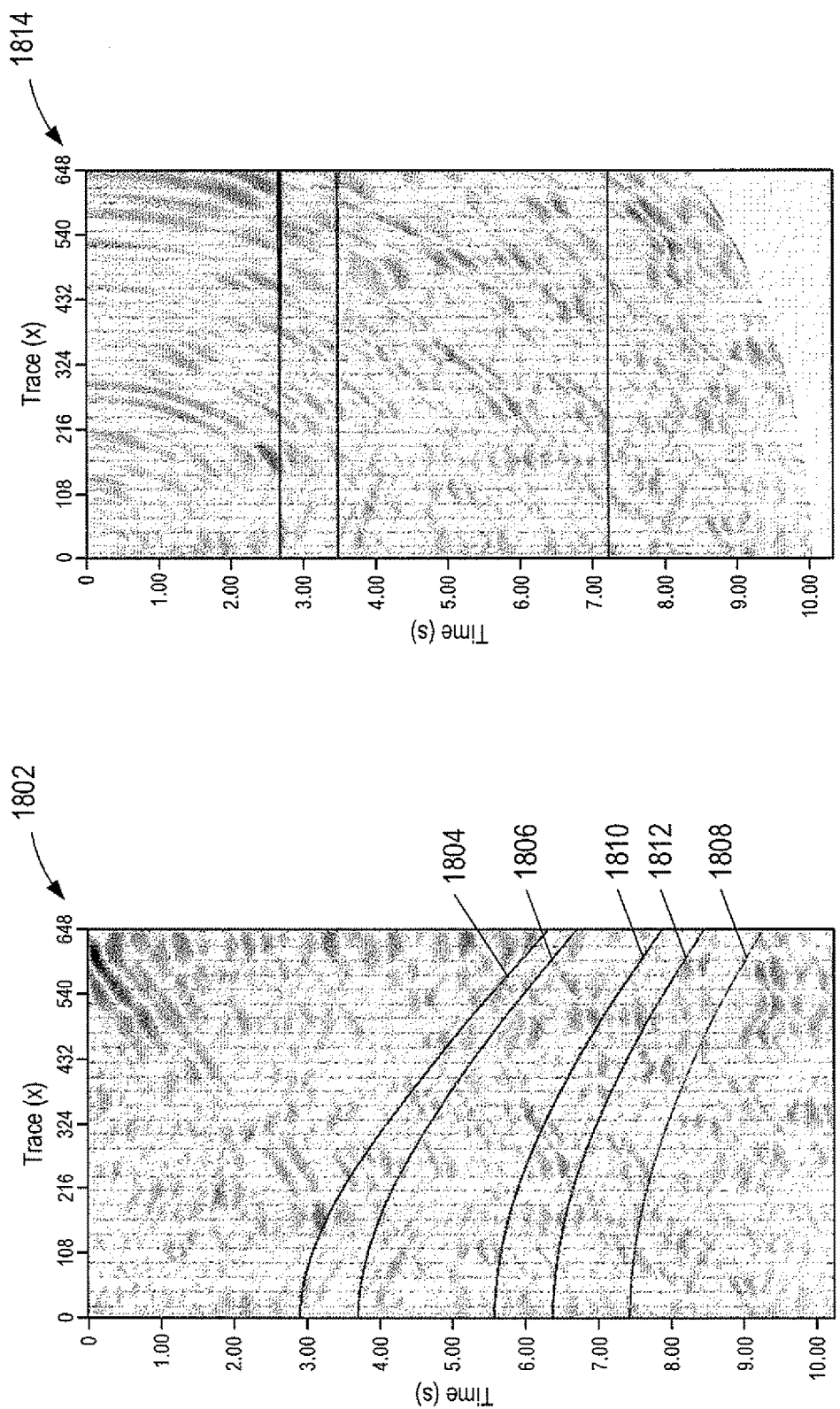

In FIG. 18, a synthetic upgoing pressure wavefield 1802 was computed from the Earth model. The synthetic pressure wavefield 1802 shows a water bottom reflection 1804, two further formation interface reflections 1806 and 1808, and two multiple reflections 1810 and 1812. A synthetic upgoing pressure wavefield 1814 was computed using the same Earth model with NMO correction, a known velocity profile for the Earth model, and the two multiple events 1810 and 1812 turned off. The synthetic pressure wavefield 1814 may be compared with the results of applying velocity analysis and demultiple to the synthetic pressure wavefield 1802 in order to assess the efficacy of velocity analysis and demultiple processes applied to the synthetic pressure wavefield 1802.

Figure 19:
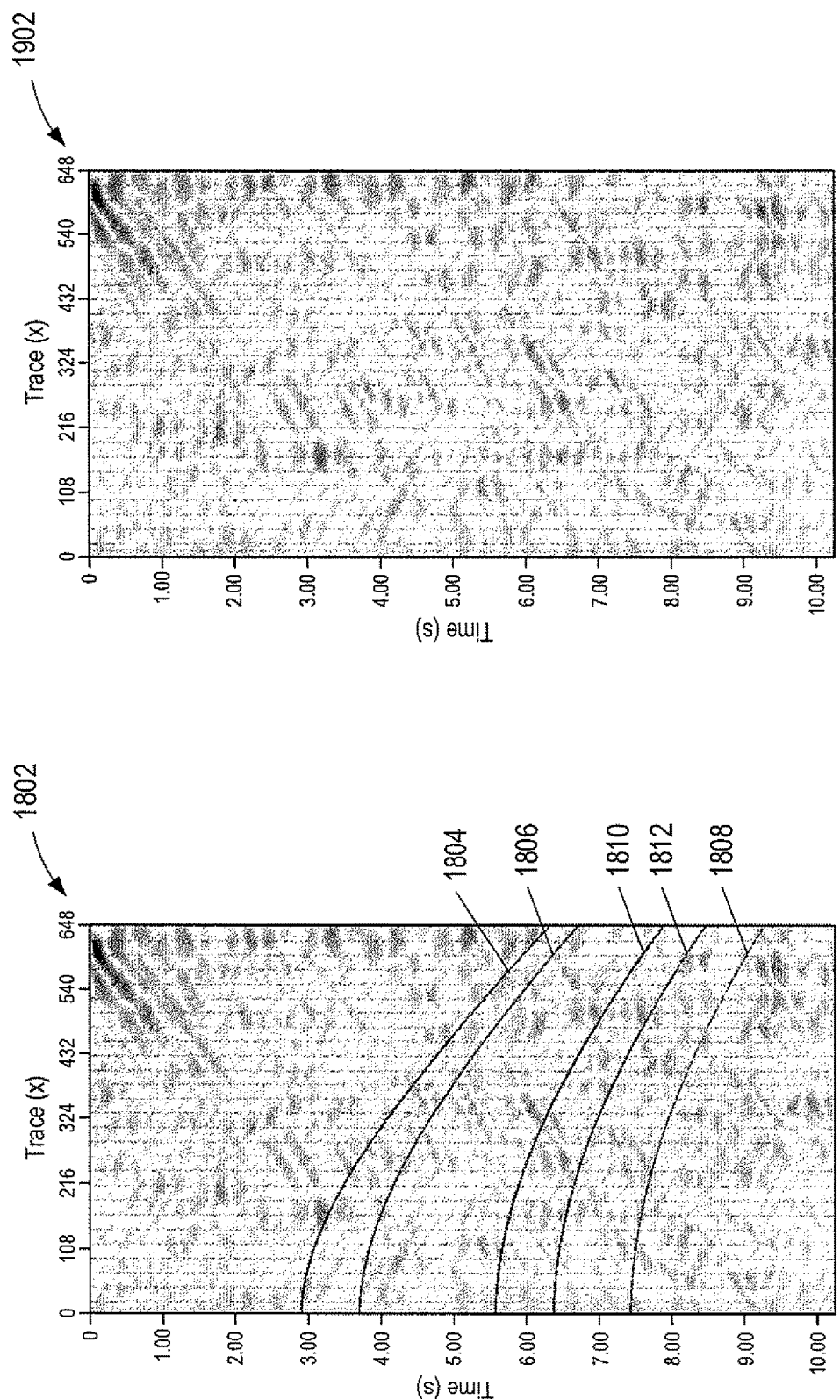

In seismic data processing, in order to measure the signal to noise ratio, the design of an accurate procedure to compute an estimated signal and noise is difficult especially when the signal-to-noise ratio is very high or low or when the noise is coherent, and the degree to which signal leaks into the noise estimate and noise leaks into the signal is not known. FIG. 19 shows a synthetic pressure wavefield 1902 that was computed using the same input used to compute the synthetic pressure wavefield 1802 but with the reflections turned off. The synthetic pressure wavefield 1902 is the noise. As a result, signal or noise may be selected and the signal and the noise do to not have to be estimated from their mixed energy as in the synthetic pressure wavefield 1902.

Figure 20:
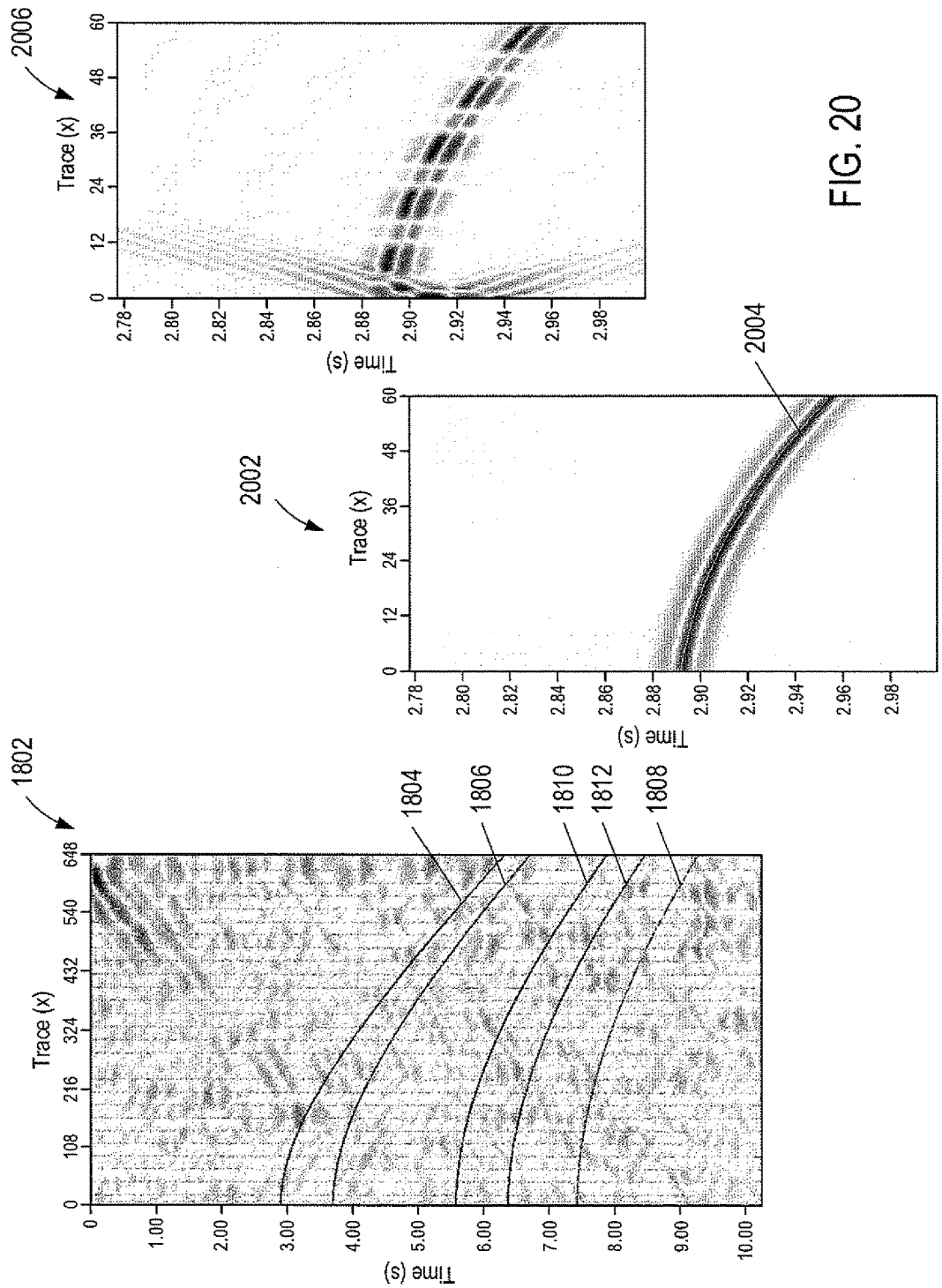

FIG. 20 shows the synthetic pressure wavefield 1802 and gather 2002 shows a portion of the synthetic pressure wavefield 1802 with curve 2004 representing an unperturbed up-going pressure formation surface reflection arrived at by simply switching off the receiver ghost. Gather 2006 shows the difference between the unperturbed up-going pressure formation surface reflection and an equivalent horizon perturbed with a depth error and an edge artifact, arrived at by (a) including a sinusoidal depth variation in the forward model and (b) including the receiver ghost in the model then removing it by wavefield separation without adequate edge protection, which shows the effect of the depth variation and the processing artifact arising if edge protection in the design of the wavefield separation flow is inadequate.

FIG. 21 shows the synthetic pressure wavefield 1802 and a synthetic pressure wavefield 2102 computed using the same seismic data but with all noise contributions turned off except bird noise so that bird noise can be quantified independently.

Figure 22A:
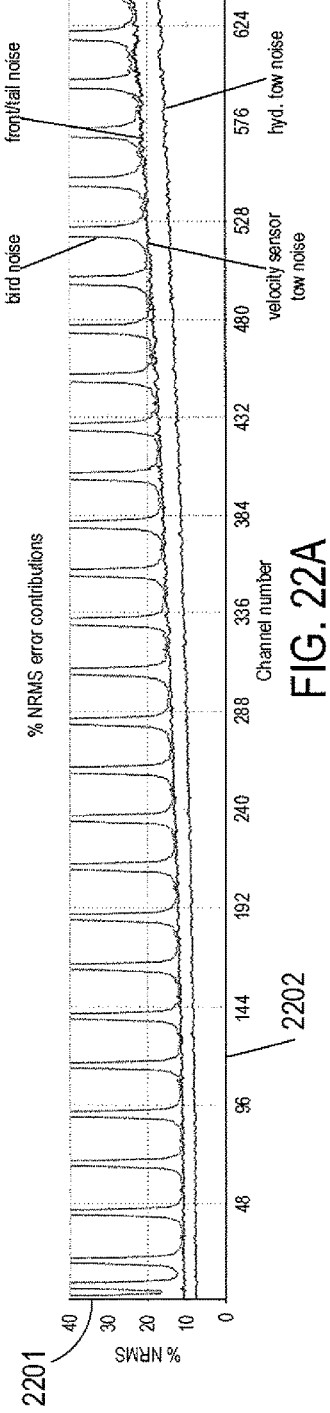
Figure 22B:
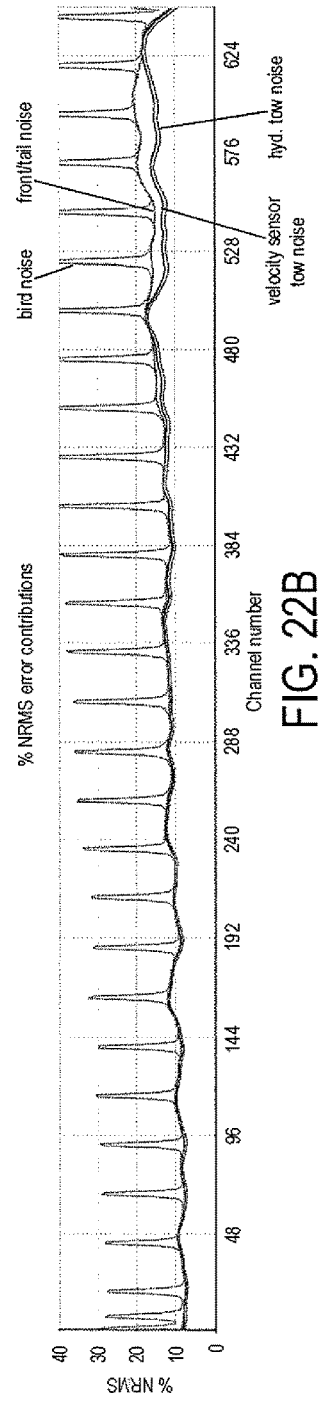
Figure 22C:
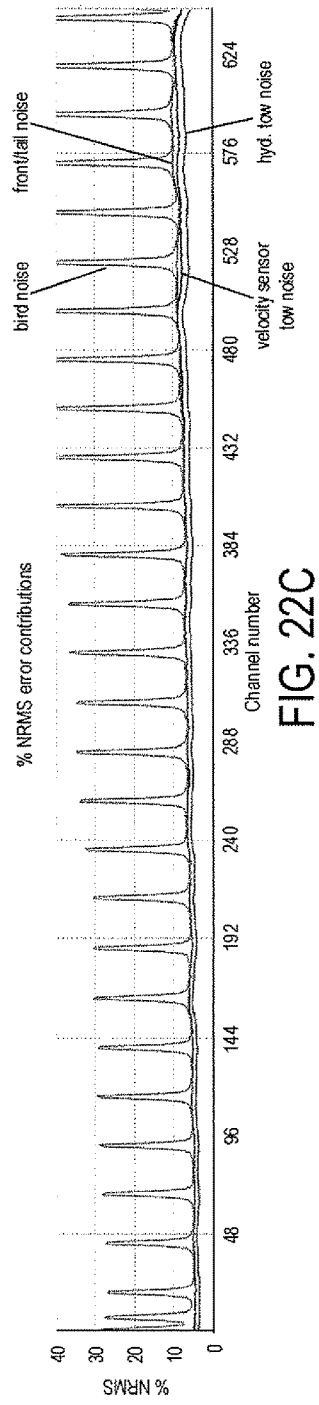

FIGS. 22A-22C shows plots of normalized RMS errors associated with the cumulative effect of four defects, versus channel number. Vertical axes, such as vertical axis 2201, are the normalized RMS (i.e. % error) and horizontal axes, such as horizontal axis 2202, are the channel number. Forward modeling was used to generate synthetic seismic data with four different types of noise: bird noise, front/tail noise, hydrophone tow noise, and particle velocity sensor tow noise. Each plot shows four curves that represent the accumulating normalized RMS error associated with four types of noise across the channels. FIG. 22A shows normalized RMS error of the synthetic seismic data after being generated by forward modeling. FIG. 22B shows normalized RMS errors of the four different types of noise at an arbitrary intermediate stage of seismic data processing (e.g. up-going pressure wavefield with the receiver ghost removed). FIG. 22C shows normalized RMS errors of the four different types of noise in an image gather. FIG. 22A-22C show propagation of the four different types of noise through synthetic seismic data, receiver-side deghosting, and depth migration. The contributions of different types of noise changes in amplitude and in spatial distribution as the different types of noise propagate through seismic data processing.

Although the above disclosure has been described in terms of particular implementations, it is not intended that the disclosure be limited to these implementations. Modifications within the spirit of this disclosure will be apparent to those skilled in the art. For example, any of a variety of different implementations may be obtained by varying any of many different design and development parameters, including programming language, underlying operating system, modular organization, control structures, data structures, and other such design and development parameters. Although implementations are described above with reference to seismic data obtained from dual sensors (i.e., dual pressure and vertical velocity sensors), implementations are not intended to be so limited. Methods and systems may be used with seismic data generated by only pressure sensors, accelerometers, or multi-component receivers (i.e., a combination of pressure and/or multiple particle motion sensors). Also, transformations other than the Fourier transformation may be used to transform seismic data to domains other than the frequency or wavenumber-frequency domains. For example, wavelet and radon transformations may be used.

The method described above may be implemented in near real-time while a marine survey is being conducted or subsequent to completion of the marine survey. The synthetic seismic data generated as described above based on actual acquisition-system attributes forms a geophysical data product indicative of a subterranean formation. The geophysical data product may include processed seismic data and may be stored on a computer-readable medium as described above. The geophysical data product may be produced offshore (i.e. by equipment on the survey vessel 102) or onshore (i.e. at a computing facility located on land) either within the United States or in another country. When the geophysical data product is produced offshore or in another country, it may be imported onshore to a data-storage facility in the United States. Once onshore in the United States, geophysical analysis may be performed on the data product.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for surveying an actual subterranean formation located beneath a body of water using a marine acquisition system including a survey vessel, one or more sources, and streamers equipped with receivers that measure wavefield responses from the subterranean formation in response to activation of the one or more sources in the body of water above the subterranean formation, the specific improvement comprising:

applying forward modeling to an Earth model of a subterranean formation based on input of defect-free acquisition-system attributes to generate synthetic seismic data without defects;

applying forward modeling to the Earth model based on input of one or more of the actual acquisition-system attributes to generate synthetic seismic data with one or more defects, each defect corresponding to a source attribute, a receiver attribute, or a noise attribute of the acquisition system;

applying one or more stages of seismic data processing to the synthetic seismic data without defects and to the synthetic seismic data with the one or more defects to generate for each stage processed synthetic seismic data without defects and processed synthetic seismic data with the one or more defects;

for at least one stage of the one or more the stages, computing an error estimate between the processed synthetic seismic data with one or more defects and the processed synthetic seismic data without defects;

adjusting one or more of the source attributes and receiver attributes of the one or more sources and streamers of the acquisition system based on the one or more error estimates; and using the adjusted acquisition system to record seismic data in a marine survey of the actual subterranean formation, thereby mitigating defects in the recorded seismic data.

2. The process of claim 1, further comprising computing difference between the synthetic seismic data with defects and the synthetic seismic data without defects.

3. The process of claim 1, wherein the actual acquisition-system attributes are engineering configuration characteristics and coordinates of an acquisition system components measured by survey vessel and noise characteristics determined from recorded seismic data.

4. The process of claim 1, wherein applying the one or more stages of seismic data processing comprises applying one or more of seismic data conditioning, denoising, receiver-side deghosting, source-side deghosting, velocity analysis, time migration, depth migration, and an imaging condition to the synthetic seismic data without defects and to the synthetic seismic data with defects.

5. The process of claim 1, wherein computing error estimates comprises computing a root mean square error between the synthetic seismic data without defects and the synthetic seismic data with defects at different stages of seismic data processing.

6. The process of claim 1, wherein computing error estimates comprises computing a cross-correlation between the synthetic seismic data without defects and the synthetic seismic data with defects at different stages of seismic data processing.

7. The process of claim 1, further comprising applying forward modeling to the Earth model to generate the synthetic seismic data with and without defects in near real-time.

8. The process of claim 1, further comprising computing the error estimates between processed synthetic seismic data with defects and processed synthetic seismic data without defects in near real-time.

9. The process of claim 1 executed at an onshore facility in near real-time.

10. The process of claim 1 executed on a programmable computer programmed to execute the method.

11. The process of claim 1 further comprising storing the synthetic seismic data in one or more data-storage devices.

12. The process of claim 1, wherein the synthetic seismic data form a geophysical data product, further comprising recording the geophysical data product on a physical, non-volatile computer-readable medium suitable for importing onshore.

13. The process of claim 11, further comprising performing geophysical analysis onshore on the geophysical data product.

14. A computer system for generating an image of an actual subterranean formation, the system comprising:
one or more processors;
one or more data-storage devices; and
a routine stored in one or more of data-storage devices that when executed by the one or more processors controls the one or more processors to carry out operations comprising:
applying forward modeling to an Earth model of a subterranean formation based on input of defect-free acquisition-system attributes to generate synthetic seismic data without defects;

applying forward modeling to the Earth model based on input of one or more actual acquisition-system attributes to generate synthetic seismic data with one or more defects, each defect corresponding to one actual source attribute, receiver attribute, or noise attribute of an acquisition system measured and recorded using onboard systems;

applying one or more stages of seismic data processing to the synthetic seismic data without defects and to the synthetic seismic data with the one or more defects to generate for each stage processed synthetic seismic data without defects and processed synthetic seismic data with the one or more defects;

for at least one stage of the one or more the stages, computing an error estimate between the processed synthetic seismic data with one or more defects and the processed synthetic seismic data without defects; and recording seismic data generated by receivers in a marine survey of the actual subterranean formation using the acquisition system with one or more source attributes and receiver attributes of one or more sources and streamers of the acquisition system adjusted based on the one or more error estimates; and computing an image of the actual subterranean formation from the recorded seismic data.

15. The system of claim 14 further comprising computing difference between the synthetic seismic data with defects and the synthetic seismic data without defects.

16. The system of claim 14, wherein the actual acquisition-system attributes are engineering configuration characteristics and coordinates of an acquisition system components measured by survey vessel and noise characteristics determined from recorded seismic data.

17. The system of claim 14, wherein applying the one or more stages of seismic data processing comprises applying one or more of seismic data conditioning, denoising, receiver-side deghosting, source-side deghosting, velocity analysis, time migration, depth migration, and an imaging condition to the synthetic seismic data without defects and to the synthetic seismic data with defects.

18. The system of claim 14, wherein computing error estimates comprises computing a root mean square error between the synthetic seismic data without defects and the synthetic seismic data with defects at difference stages of seismic data processing.

19. The system of claim 14, wherein computing error estimates comprises computing a cross-correlation between the synthetic seismic data without defects and the synthetic seismic data with defects at different stages of seismic data processing.

20. The system of claim 14 further comprising applying forward modeling to the Earth model to generate the synthetic seismic data with and without defects in near real-time.

21. The system of claim 14 further comprising computing the error estimates between processed synthetic seismic data with defects and processed synthetic seismic data without defects in near real-time.

22. The system of claim 14 executed at an onshore facility in near real-time.

23. A non-transitory computer-readable medium having machine-readable instructions encoded thereon for enabling one or more processors of a computer system to perform the operations comprising:
- applying forward modeling to an Earth model of a subterranean formation based on input of defect-free acquisition-system attributes to generate synthetic seismic data without defects;
- applying forward modeling to the Earth model based on input of one or more of the actual acquisition-system attributes to generate synthetic seismic data with one or more defects, each defect corresponding to one actual source attribute, receiver attribute, or noise attribute of an acquisition system to be used in a marine survey of an actual subterranean formation;
- applying one or more stages of seismic data processing to the synthetic seismic data without defects and to the synthetic seismic data with the one or more defects to generate for each stage processed synthetic seismic data without defects and processed synthetic seismic data with the one or more defects;
- for at least one stage of the one or more the stages, computing an error estimate between the processed synthetic seismic data with one or more defects and the processed synthetic seismic data without defects; and
- computing an image of the actual subterranean formation from seismic data recorded in a marine survey of the actual subterranean formation using the acquisition system with one or more source attributes and receiver attributes of one or more sources and streamers of the acquisition system adjusted based on the error estimates to mitigate defects in the image.

24. The medium of claim 23, further comprising computing difference between the synthetic seismic data with defects and the synthetic seismic data without defects.

25. The medium of claim 23, wherein the actual acquisition-system attributes are engineering configuration characteristics and coordinates of an acquisition system components measured by survey vessel and noise characteristics determined from recorded seismic data.

26. The medium of claim 23, wherein applying the one or more stages of seismic data processing comprises applying one or more of seismic data conditioning, denoising, receiver-side deghosting, source-side deghosting, velocity analysis, time migration, depth migration, and an imaging condition to the synthetic seismic data without defects and to the synthetic seismic data with defects.

27. The medium of claim 23, wherein computing error estimates comprises computing a root mean square error between the synthetic seismic data without defects and the synthetic seismic data with defects at difference stages of seismic data processing.

28. The medium of claim 23, wherein computing error estimates comprises computing a cross-correlation between the synthetic seismic data without defects and the synthetic seismic data with defects at different stages of seismic data processing.

29. The medium of claim 23, further comprising applying forward modeling to the Earth model to generate the synthetic seismic data with and without defects in near real-time.

30. The medium of claim 23, further comprising computing the error estimates between processed synthetic seismic data with defects and processed synthetic seismic data without defects in near real-time.

31. The medium of claim 23 executed at an onshore facility in near real-time.

* * * * *